United States Patent
Nakaguma et al.

(10) Patent No.: US 11,645,062 B2
(45) Date of Patent: May 9, 2023

(54) SOFTWARE UPDATE DEVICE AND SOFTWARE UPDATE SYSTEM

(71) Applicant: Clarion Co., Ltd., Saitama (JP)

(72) Inventors: Kyouichi Nakaguma, Tokyo (JP);
Hidetoshi Teraoka, Tokyo (JP);
Tomochika Ozaki, Tokyo (JP); Hiroshi Kodaka, Saitama (JP); Tsuneo Sobue, Tokyo (JP)

(73) Assignee: Clarion Co., Ltd., Saitama (JP)

( * ) Notice: Subject to any disclaimer, the term of this patent is extended or adjusted under 35 U.S.C. 154(b) by 70 days.

(21) Appl. No.: 16/473,929

(22) PCT Filed: Oct. 26, 2017

(86) PCT No.: PCT/JP2017/038792
§ 371 (c)(1),
(2) Date: Jun. 26, 2019

(87) PCT Pub. No.: WO2018/123242
PCT Pub. Date: Jul. 5, 2018

(65) Prior Publication Data
US 2019/0354363 A1 Nov. 21, 2019

(30) Foreign Application Priority Data
Dec. 27, 2016 (JP) .............................. JP2016-252787

(51) Int. Cl.
*G06F 8/65* (2018.01)
*G06F 9/4401* (2018.01)
(Continued)

(52) U.S. Cl.
CPC ................ *G06F 8/65* (2013.01); *G06F 9/445* (2013.01); *G06F 9/4411* (2013.01);
(Continued)

(58) Field of Classification Search
CPC .. H04L 67/34; G06F 8/65; G06F 9/445; G06F 9/4411; G06F 13/128; G07C 5/008; G07C 5/02
See application file for complete search history.

(56) References Cited

U.S. PATENT DOCUMENTS 8,868,796 B1 * 10/2014 Wojcik ...................... G06F 8/65 710/5
2005/0228798 A1 * 10/2005 Shepard .................... G06F 8/65
(Continued)

FOREIGN PATENT DOCUMENTS

| CN | 1668010 A | 9/2005 |
|---|---|---|
| CN | 105975254 A | 9/2016 |

(Continued)

OTHER PUBLICATIONS

Japanese-language Office Action issued in counterpart Japanese Application No. 2016-252787 dated Dec. 17, 2019 with English translation (eight pages).
(Continued)

*Primary Examiner* — Geoffrey R St Leger
*Assistant Examiner* — Cheneca Smith
(74) *Attorney, Agent, or Firm* — Crowell & Moring LLP

(57) ABSTRACT

A software update device includes a reception unit that receives update data from the server; an update unit that updates software using the update data; a communication interface that communicates with the other software update devices; an update timing reception unit that receives from the server an update timing in which conditions for updating the software including a reception of an update trigger are described; a notification information reception unit that receives notification information including conditions for transmitting the update trigger to another software update device; an update trigger notification unit that transmits the update trigger to the other software update devices; an
(Continued)

update trigger reception unit that receives the update trigger from the other software update devices; and an update start determination unit that causes the update unit to update the software when it is determined that all the conditions described in the update timing are satisfied.

17 Claims, 15 Drawing Sheets

(51) Int. Cl.
    *G06F 9/445*     (2018.01)
    *G06F 13/12*     (2006.01)
    *G07C 5/00*     (2006.01)
    *G07C 5/02*     (2006.01)
    *H04L 67/00*     (2022.01)

(52) U.S. Cl.
    CPC ........... *G06F 13/128* (2013.01); *G07C 5/008* (2013.01); *G07C 5/02* (2013.01); *H04L 67/34* (2013.01)

(56) References Cited

U.S. PATENT DOCUMENTS

| | | | |
|---|---|---|---|
| 2006/0106806 A1* | 5/2006 | Sperling | G06F 21/57 |
| 2009/0119655 A1* | 5/2009 | Quilty | H04W 24/04 |
| | | | 717/168 |
| 2010/0169876 A1* | 7/2010 | Mann | G06F 8/65 |
| | | | 717/170 |
| 2010/0325622 A1* | 12/2010 | Morton | G06F 8/654 |
| | | | 717/168 |
| 2011/0107322 A1 | 5/2011 | Hashiguchi | |
| 2012/0216183 A1 | 8/2012 | Mahajan et al. | |
| 2015/0227359 A1 | 8/2015 | Todoroki et al. | |
| 2016/0147525 A1 | 5/2016 | Choi | |
| 2016/0266890 A1* | 9/2016 | Aleksandrov | G06F 8/65 |
| 2016/0371077 A1 | 12/2016 | Moeller et al. | |
| 2017/0031602 A1* | 2/2017 | Xu | G06F 8/62 |

FOREIGN PATENT DOCUMENTS

| | | |
|---|---|---|
| JP | 2006-11647 A | 1/2006 |
| JP | 2011-95950 A | 5/2011 |
| JP | 2014-41456 A | 3/2014 |

OTHER PUBLICATIONS

International Search Report (PCT/ISA/210) issued in PCT Application No. PCT/JP2017/038792 dated Dec. 19, 2017 with English translation (four (4) pages).

Japanese-language Written Opinion (PCT/ISA/237) issued in PCT Application No. PCT/JP2017/038792 dated Dec. 19, 2017 (four (4) pages).

Extended European Search Report issued in European Application No. 17886794.1 dated Jul. 17, 2020 (nine (9) pages).

Chinese-language Office Action issued in Chinese Application No. 201780080696.5 dated Oct. 18, 2022 with English translation (26 pages).

* cited by examiner

[FIG. 1]
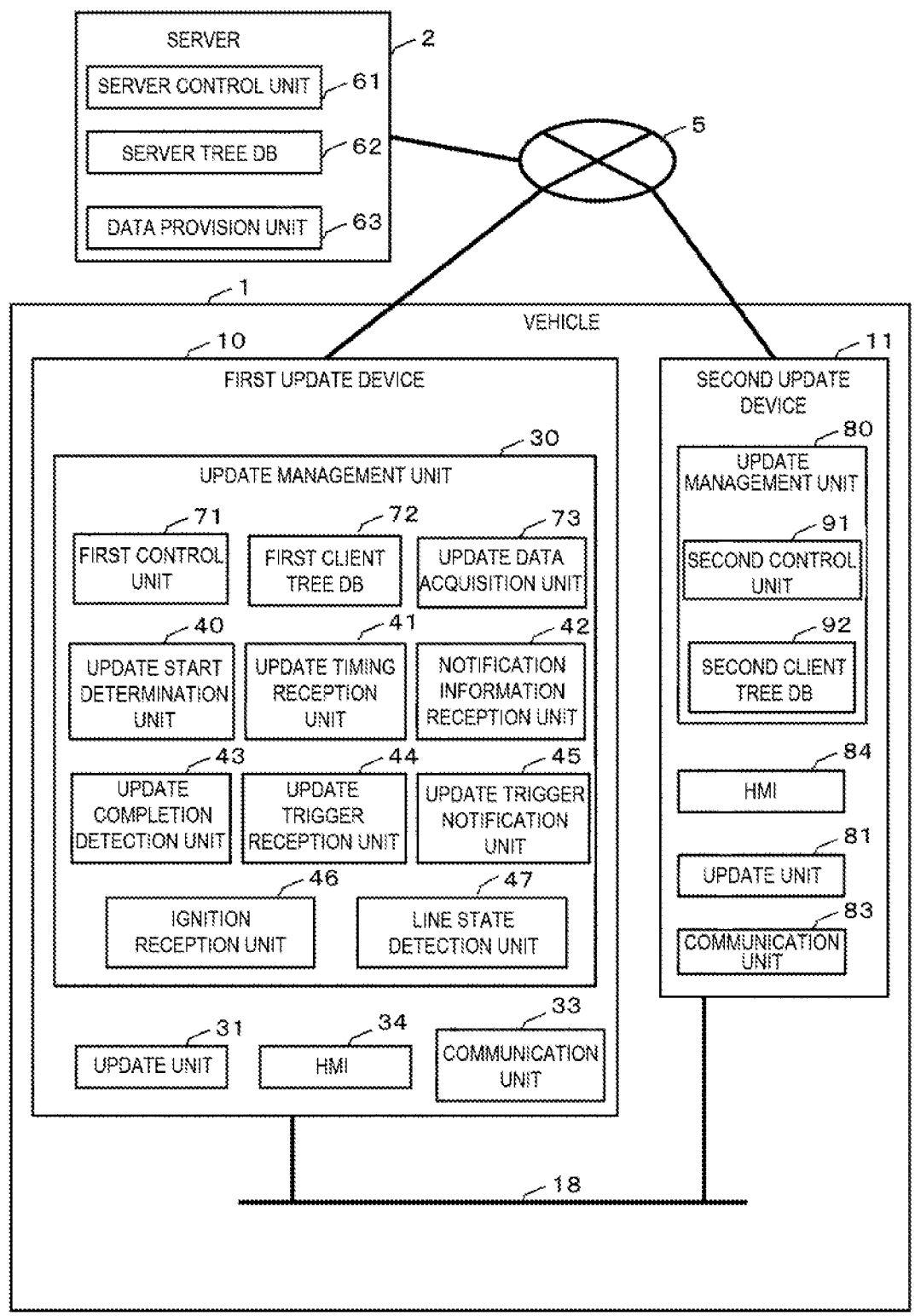

[FIG. 2]
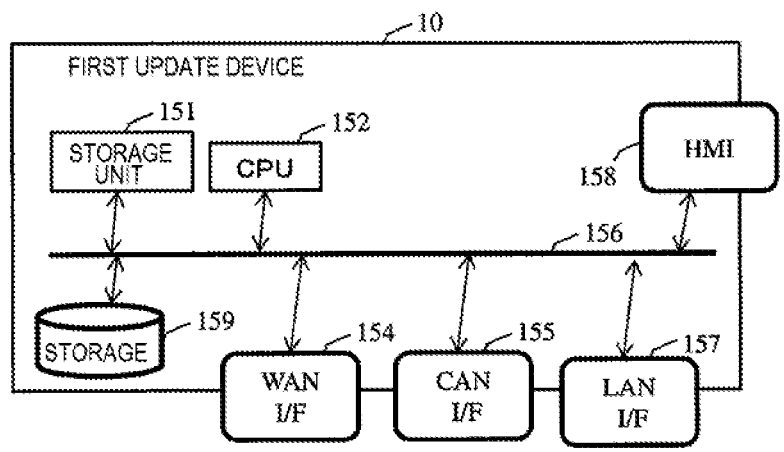
[FIG. 3]
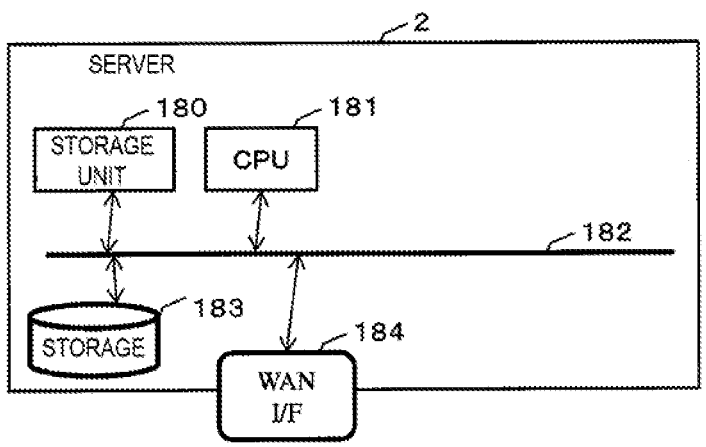

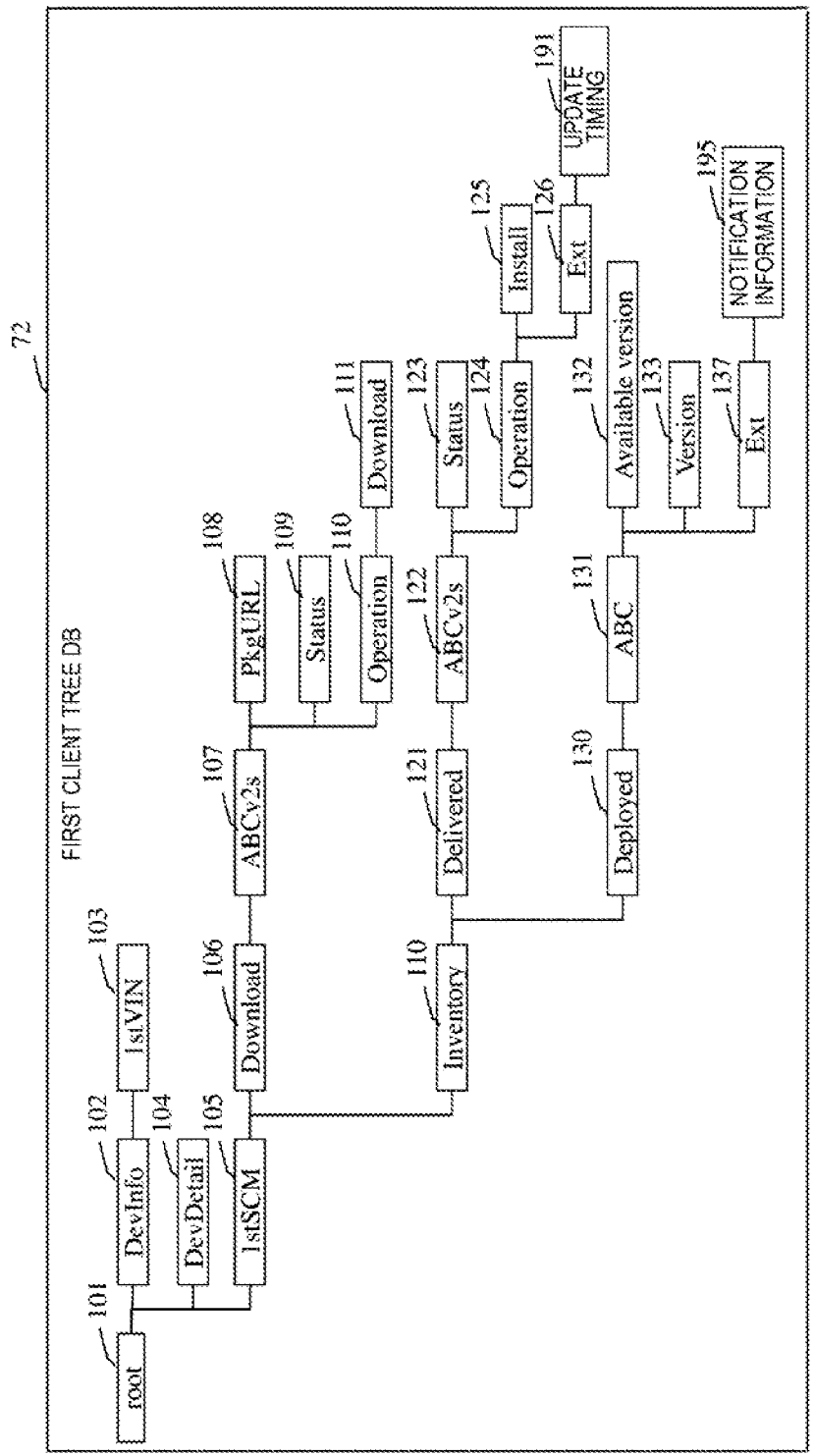
[FIG. 4]

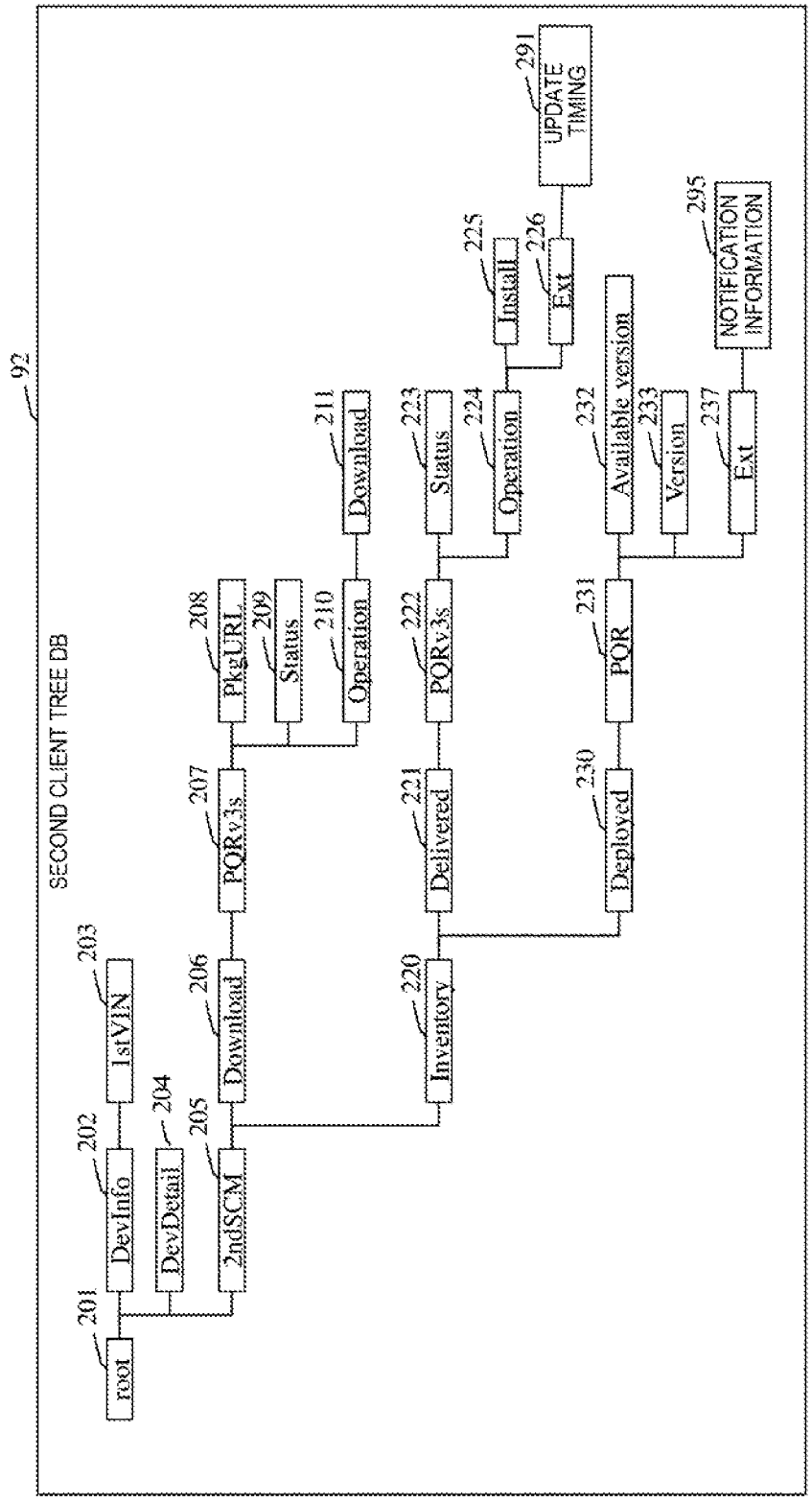

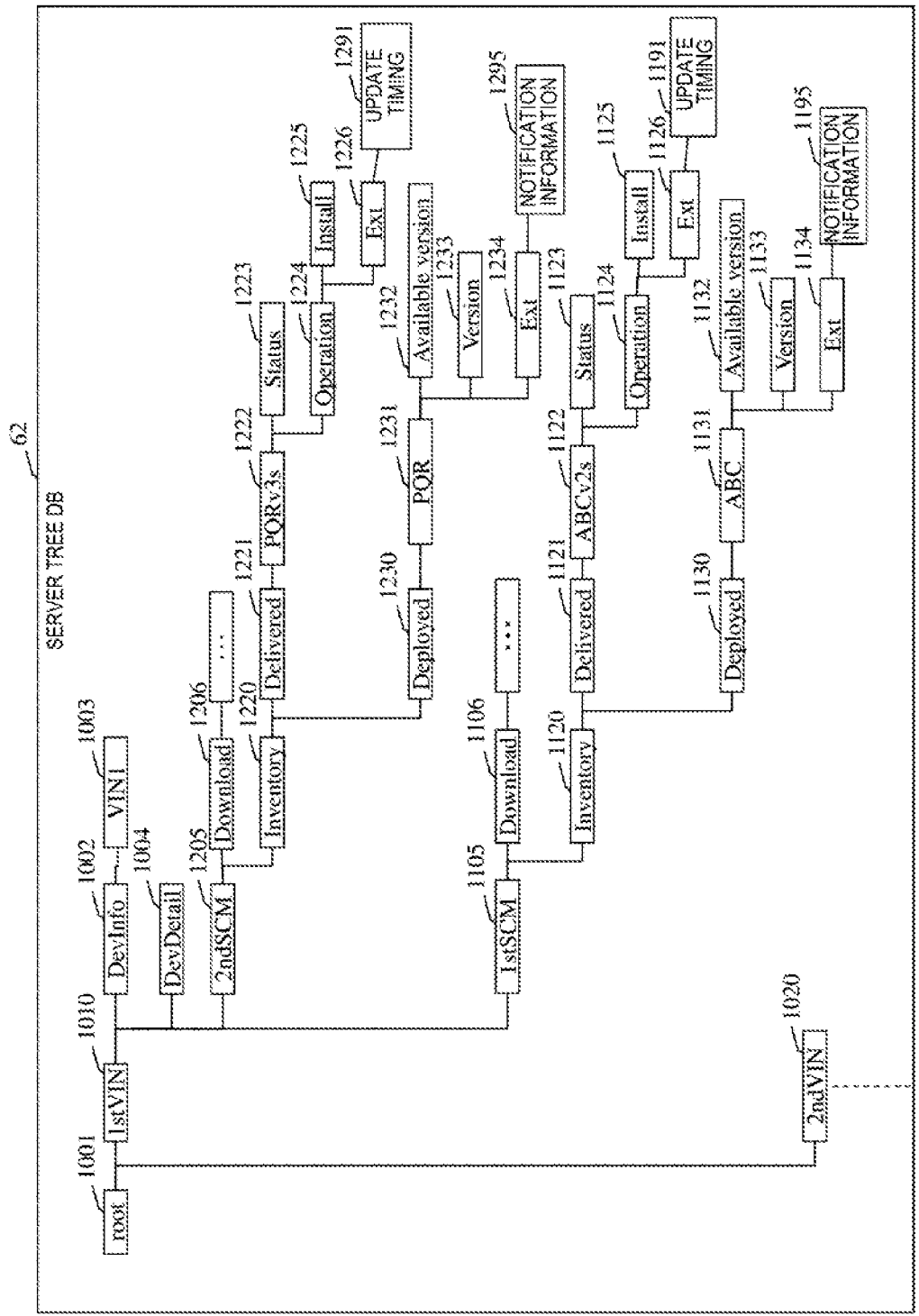
[FIG. 6]

[FIG. 7]
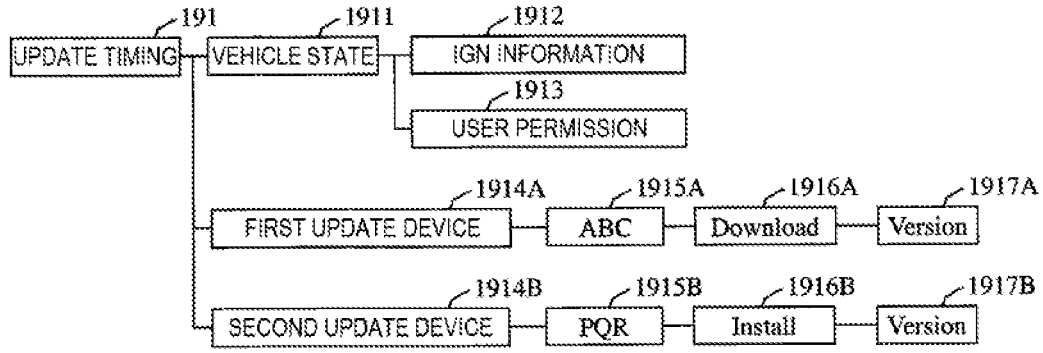
[FIG. 8]
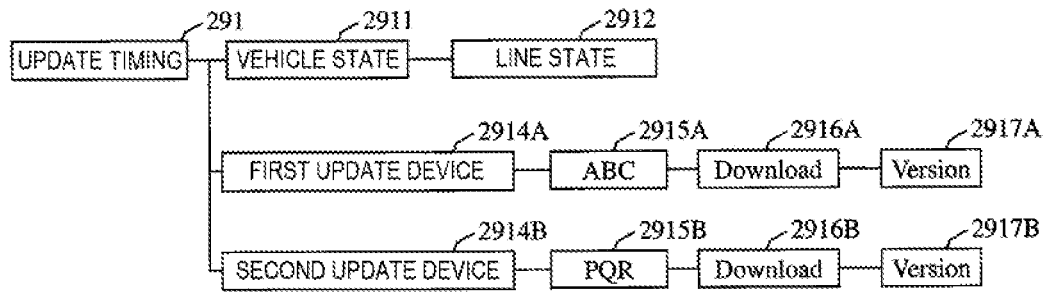
[FIG. 9]
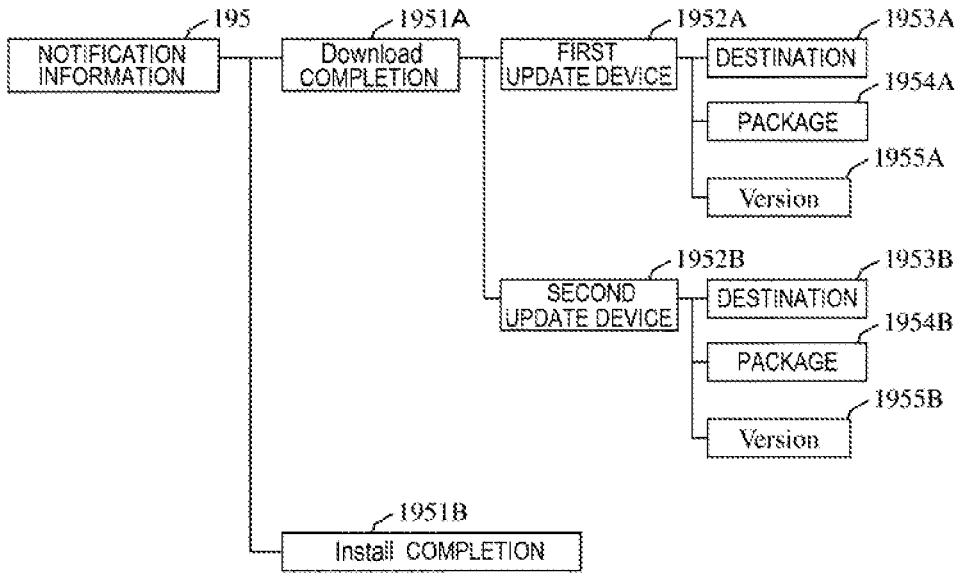

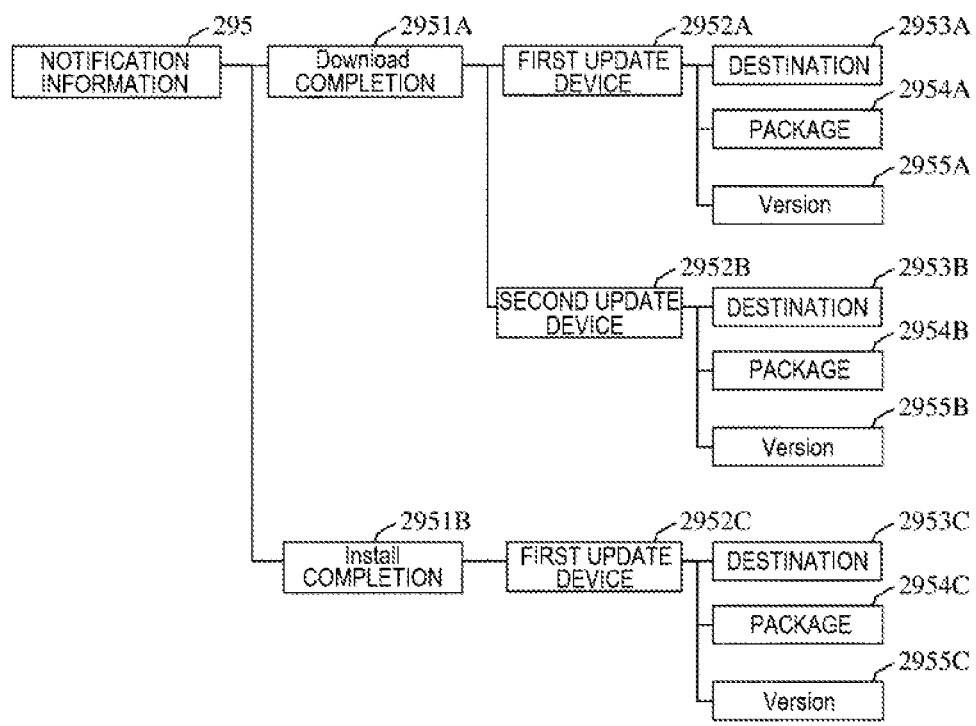
[FIG. 10]

[FIG. 11]
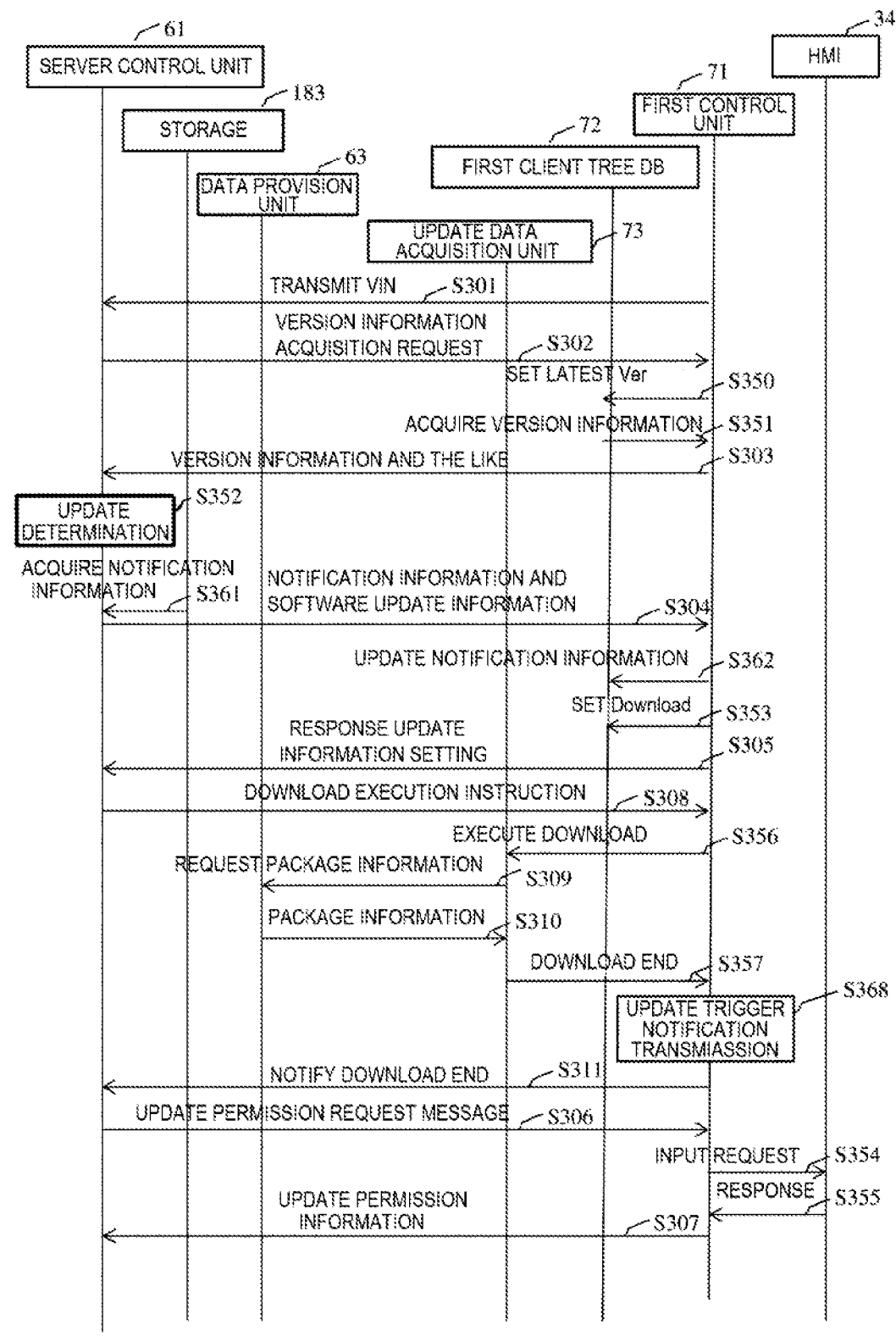

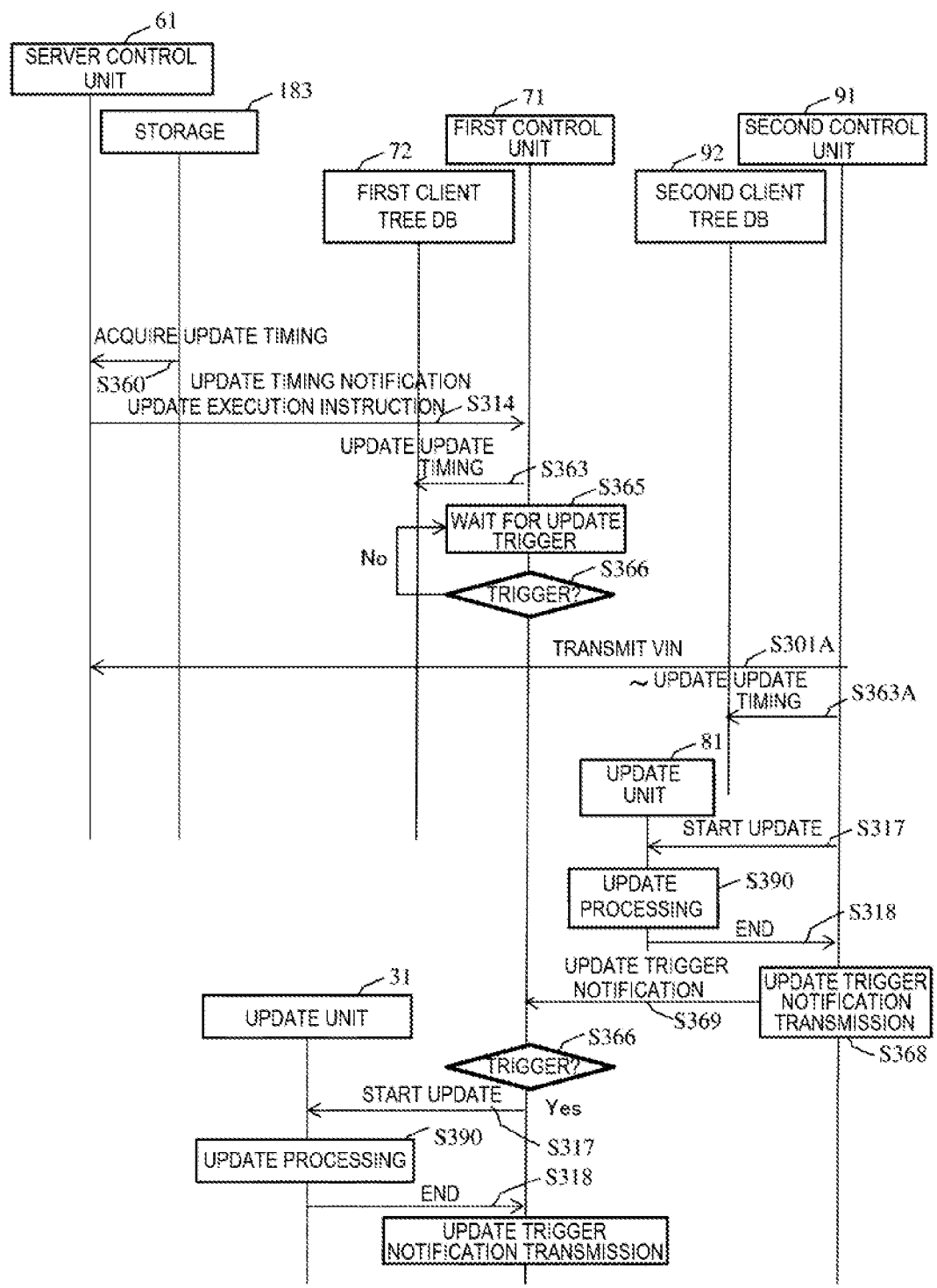
[FIG. 12]

[FIG. 13]
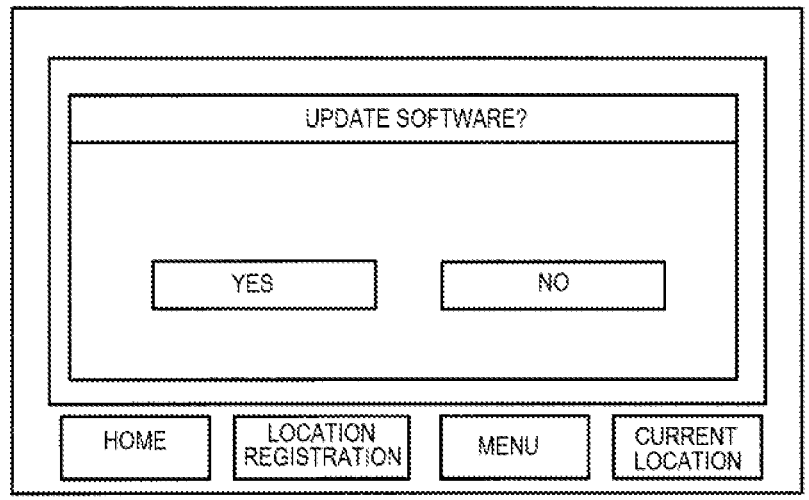
[FIG. 14]
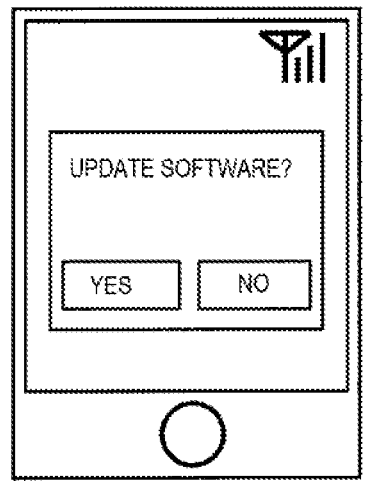

[FIG. 15]
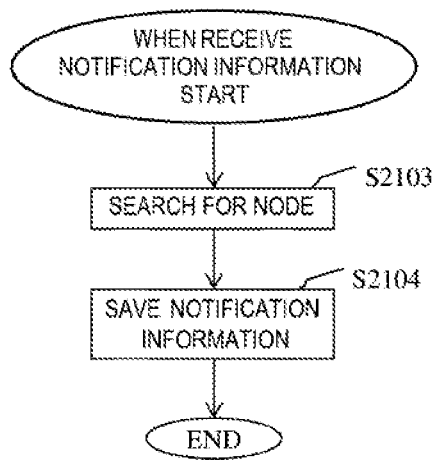
[FIG. 16]
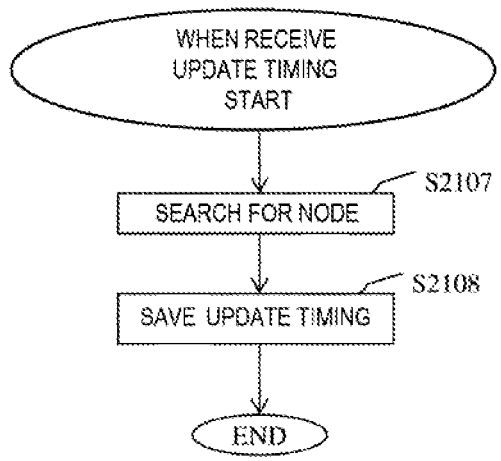

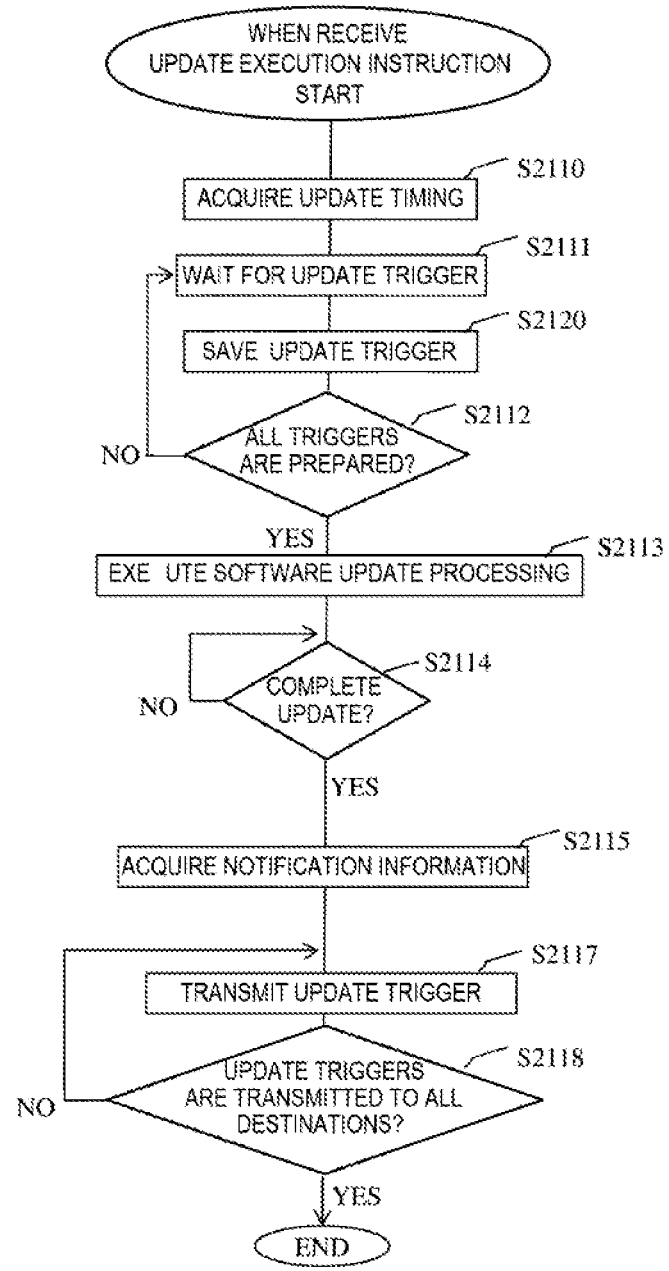
[FIG. 17]

[FIG. 18]
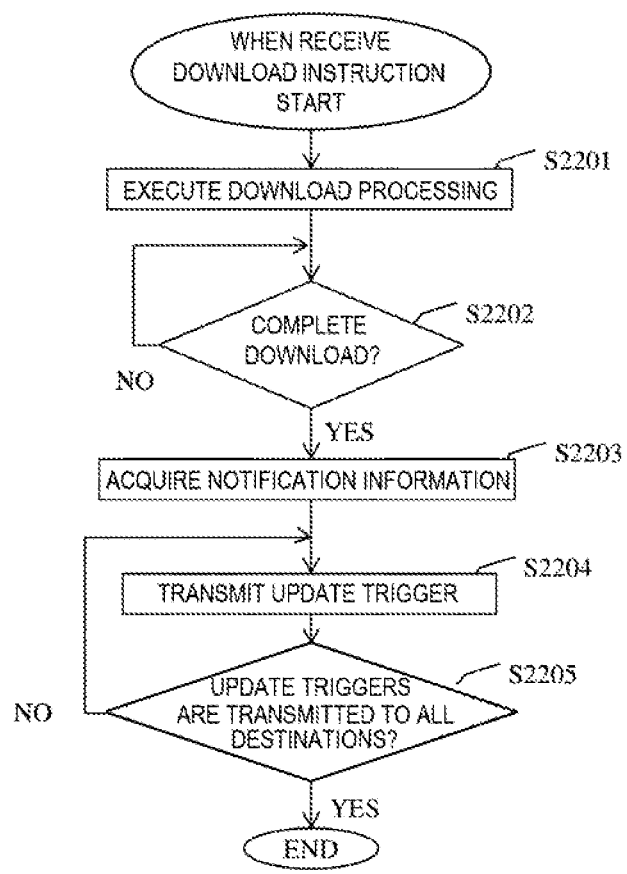

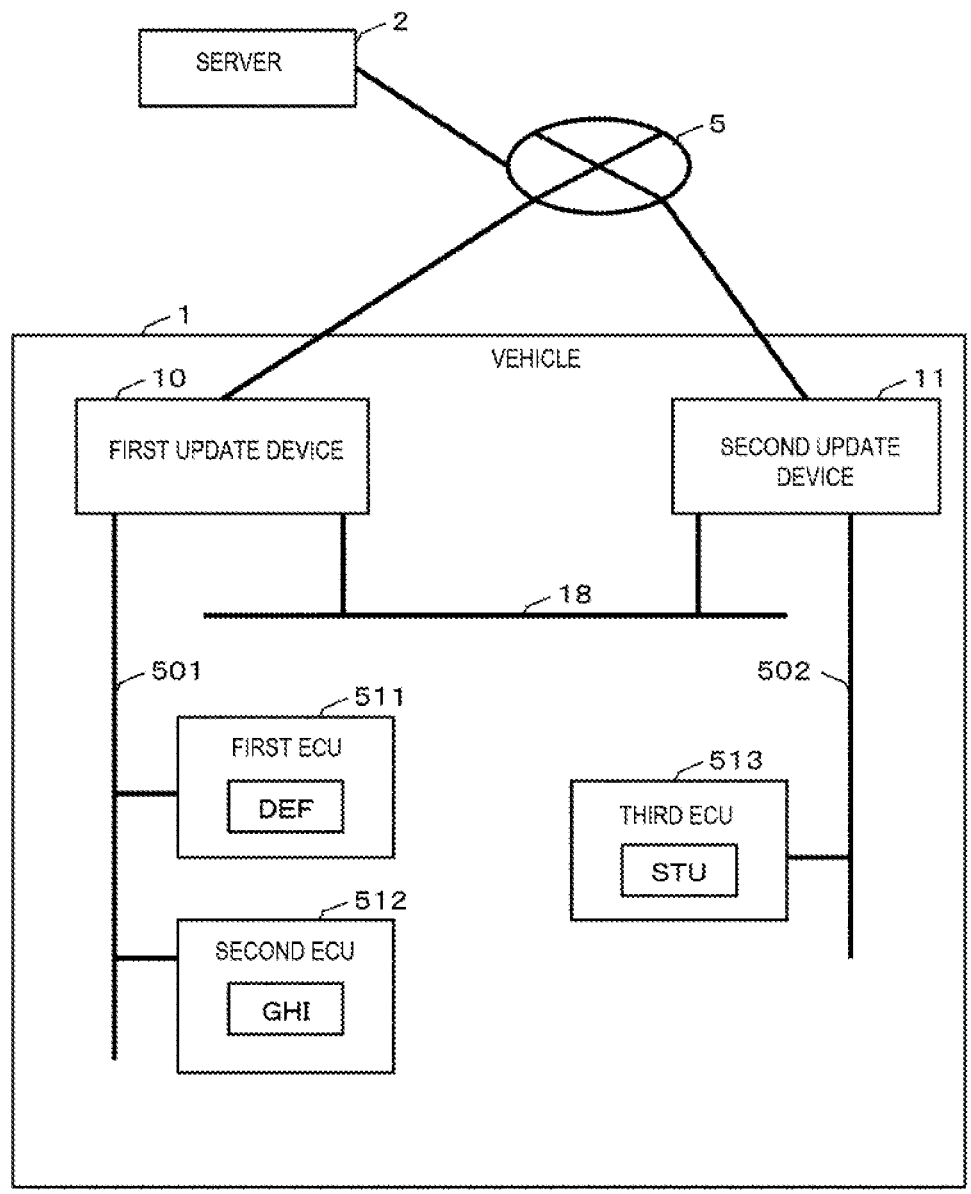
[FIG. 19]

[FIG. 20]
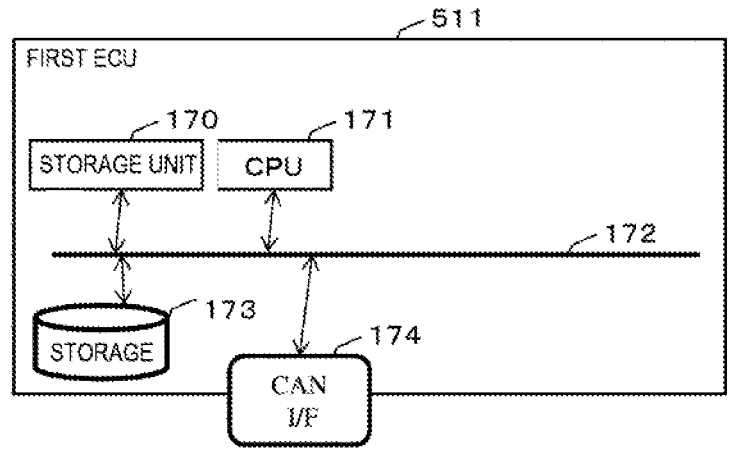
[FIG. 21]
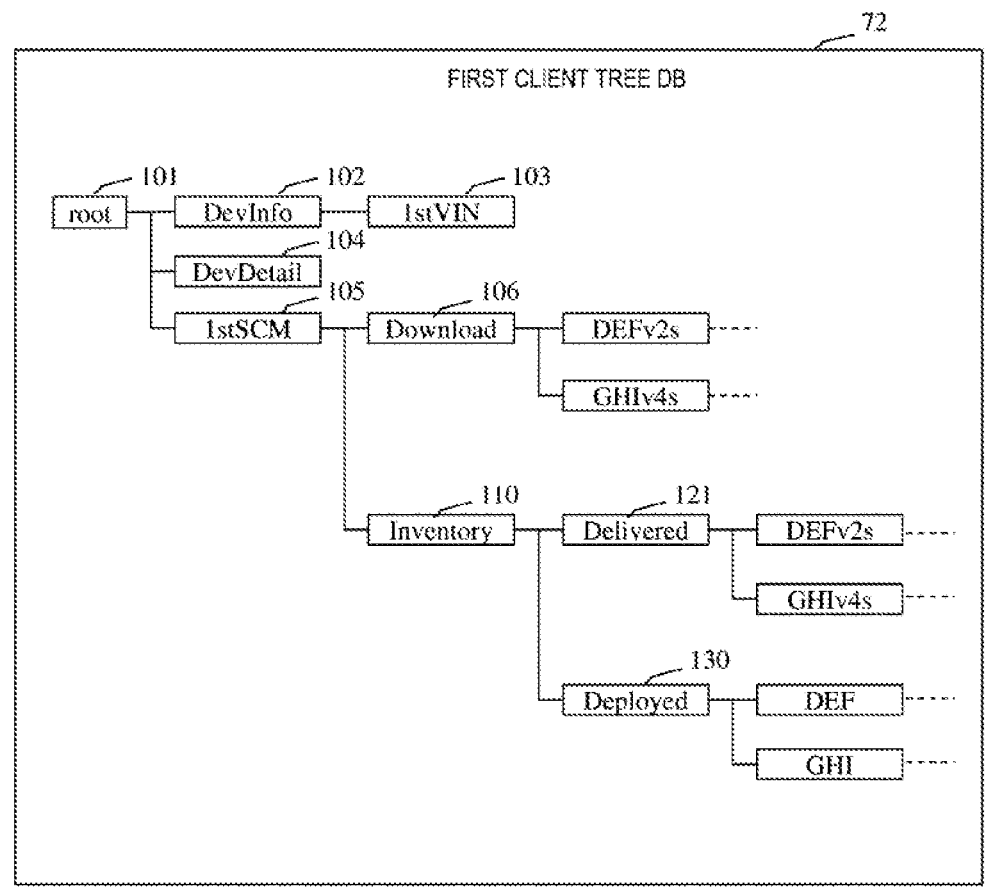

SOFTWARE UPDATE DEVICE AND SOFTWARE UPDATE SYSTEM

TECHNICAL FIELD

The present invention relates to a software update device and a software update system.

BACKGROUND ART

In recent years, an electronic control unit (ECU) has been often used to control a vehicle. In the related art, software that controls the operation of the ECU is updated by a technician, but there is an increasing need for a service that can update this software remotely. For example, PTL 1 discloses a network device that includes a control unit; when incorporated predetermined software is updated, the control unit transmits the version of the updated predetermined software from a communication unit to another network device, and further transmits the updated predetermined software to the another network device in response to a request from the another network device; on the other hand, when the communication unit receives the version of the predetermined software incorporated in the another network device, and the determination unit determines that the predetermined software to be incorporated needs a change, the control unit acquires the predetermined software from the another network device, and incorporates the acquired predetermined software instead of the incorporated predetermined software.

PRIOR ART LITERATURE

Patent Literature

PTL 1: JP-A-2011-95950

SUMMARY OF INVENTION

Technical Problem

The invention described in PTL 1 cannot update software while satisfying software dependencies.

Solution to Problem

A first aspect of the invention provides a software update device connected to one or more other software update devices and a server via a network, the device including: a reception unit that receives update data from the server; an update unit that updates software using the update data; a communication unit that communicates with the other software update devices; an update timing reception unit that receives from the server an update timing in which conditions for updating the software including a reception of an update trigger are described; a notification information reception unit that receives from the server notification information including conditions for transmitting the update trigger to the another software update device; an update trigger notification unit that transmits the update trigger to the other software update devices based on the notification information; an update trigger reception unit that receives the update trigger from the other software update devices; and an update start determination unit that causes the update unit to update the software when it is determined that all the conditions described in the update timing are satisfied.

A second aspect of the invention provides a software update device connected to one or more other software update devices and a server via a network, the device including: a reception unit that receives update data from the server; an update unit that updates software using the update data; a communication unit that communicates with the other software update devices; an update timing reception unit that receives from the server an update timing in which conditions for updating the software including a reception of an update trigger are described; an update trigger reception unit that receives the update trigger from the other software update devices; and an update start determination unit that causes the update unit to update the software when it is determined that all the conditions described in the update timing are satisfied.

A third aspect of the invention provides a software update device connected to one or more other software update devices and a server via a network, the device including: a reception unit that receives update data from the server; an update unit that updates software using the update data; a communication unit that communicates with the other software update devices; an update timing reception unit that receives from the server an update timing in which conditions for updating the software are described; a notification information reception unit that receives from the server notification information including conditions for transmitting an update trigger to the another software update device; an update trigger notification unit that transmits the update trigger to the other software update devices based on the notification information; an update start determination unit that causes the update unit to update the software when it is determined that all the conditions described in the update timing are satisfied.

A fourth aspect of the invention provides a software update system including a plurality of software update devices and a server, wherein the server includes a distribution unit that distributes update data for updating software, and each of the plurality of software update devices includes: a reception unit that receives the update data from the server; an update unit that updates the software using the update data; a communication unit that communicates with the server and another software update device; an update timing reception unit that receives from the server an update timing in which conditions for updating the software including a reception of an update trigger are described; a notification information reception unit that receives from the server notification information including conditions for transmitting the update trigger to the another software update device; an update trigger notification unit that transmits the update trigger to the another software update device based on the notification information; an update trigger reception unit that receives the update trigger from the another software update device; and an update start determination unit that causes the update unit to update the software when it is determined that all the conditions described in the update timing are satisfied.

Advantageous Effect

According to the invention, software can be updated while satisfying software dependencies.

BRIEF DESCRIPTION OF DRAWINGS

FIG. 1 is a diagram showing a configuration and a functional block of a software update system according to a first embodiment.

FIG. 2 is a diagram showing a hardware configuration of a first update device.

FIG. 3 is a diagram showing a hardware configuration of a server.

FIG. 4 is a diagram showing a configuration of a first client tree DB.

FIG. 5 is a diagram showing a configuration of a second client tree DB.

FIG. 6 is a diagram showing a configuration of a server tree DB.

FIG. 7 is a diagram showing a configuration of an update timing included in the first client tree DB.

FIG. 8 is a diagram showing a configuration of an update timing included in the second client tree DB.

FIG. 9 is a diagram showing a configuration of notification information included in the first client tree DB.

FIG. 10 is a diagram showing a configuration of notification information included in the second client tree DB.

FIG. 11 is a first half of a sequence diagram concerning a software update.

FIG. 12 is a second half of the sequence diagram concerning the software update.

FIG. 13 is a diagram showing an example of a display in which an HMI inquires a user whether to update.

FIG. 14 is a diagram showing an example of a display in which the HMI inquires the user whether to update when the HMI operates as an HMI control unit.

FIG. 15 is a flowchart showing operations when receiving the notification information from the server.

FIG. 16 is a flowchart showing operations when receiving the update timing from the server.

FIG. 17 is a flowchart showing operations when receiving an update execution instruction from the server.

FIG. 18 is a flowchart showing operations at the time of receiving a download execution instruction from the server.

FIG. 19 is a diagram showing a configuration of a software update system according to a second embodiment.

FIG. 20 is a diagram showing a hardware configuration of a first ECU.

FIG. 21 is a diagram showing an outline of a first client tree DB according to the second embodiment.

DESCRIPTION OF EMBODIMENTS

First Embodiment

A first embodiment of a software update system S will be described below with reference to FIGS. 1 to 18.

FIG. 1 is a diagram showing a configuration and a functional block of the software update system S according to the first embodiment. The software update system S includes a vehicle 1 and a server 2 that are interconnected via a wide area network, for example, Internet 5.

The vehicle 1 includes a first update device 10, a second update device 11, and a LAN network 18. The first update device 10 communicates with the second update device 11 via the LAN network 18. The first update device 10 and the second update device 11 communicate with the server 2. The first update device 10 and the second update device 11 have the same hardware configuration and the same function. However, software to be updated and data that are respectively stored in the first update device 10 and the second update device 11 are different. Hereinafter, the configuration of the first update device 10 and the difference between the second update device 11 and the first update device 10 will be mainly described.

In the present embodiment, the first update device 10 updates software "ABC" installed in the first update device 10, and the second update device 11 updates software "PQR" installed in the second update device 11. The software "ABC" and the software "PQR" may be one program or a group of a plurality of programs running on an OS. Further, the program may also runs on a part of the OS such as a kernel or on the entire OS.

(Functional Configuration of First Update Device)

The first update device 10 includes an update management unit 30, an update unit 31, an HMI 34, and a communication unit 33. The update unit 31 updates software (not shown) in the first update device 10 using update data received from the server 2. The HMI 34 is a human-machine interface, that is, an interface unit with a user. The HMI 34 presents information to the user with sound or video and receives an input from the user. However, the HMI 34 does not have a physical interface with the user, and may function as an interface control unit that controls a device including an interface with the user. The communication unit 33 communicates with the server 2, the second update device 11, and an ECU (not shown) included in the vehicle 1.

The update management unit 30 includes a first control unit 71, a first client tree DB 72, an update data acquisition unit 73, an update start determination unit 40, an update timing reception unit 41, a notification information reception unit 42, an update completion detection unit 43, an update trigger reception unit 44, an update trigger notification unit 45, an ignition reception unit 46, and a line state detection unit 47.

The first control unit 71 outputs an operation command to each component of the update management unit 30. The first client tree DB 72 is a tree-structure database in which information related to the first update device 10 is stored. The configuration of the first client tree DB 72 will be described below with reference to the drawings. The update data acquisition unit 73 acquires update data that is necessary for the software update of the first update device 10 from the server 2 and stores the update data in a storage described below.

The update start determination unit 40 operates the update unit 31 when the update start determination unit 40 determines that the update unit 31 is in a state of starting the software update based on an update timing that is described below and received by the update timing reception unit 41. A condition for updating the software is described in the update timing. The update start determination unit 40 determines whether this condition is satisfied according to a reception of an update trigger described below, a state of the vehicle, and the like.

The update timing reception unit 41 receives the update timing from the server 2 and stores the update timing in the storage described below. The notification information reception unit 42 receives notification information described below from the server 2 and stores the notification information in the storage described below. The update completion detection unit 43 detects whether the software update executed by the update unit 31 is completed and transmits the detection result to the update trigger notification unit 45. The update trigger reception unit 44 receives update triggers transmitted by the first update device 10 and the second update device 11. That is, in the present embodiment, the first update device 10 transmits the update trigger to itself. The update trigger reception unit 44 stores the received update trigger in the storage described later. The update trigger notification unit 45 transmits the update trigger based on a description of the notification information described below.

The ignition reception unit 46 acquires an operation state of an engine or a setting state of an ignition switch of the vehicle 1 and notifies the update start determination unit 40 and the update trigger notification unit 45 of the state. The ignition reception unit 46 may notify the update start determination unit 40 and the update trigger notification unit 45 of the state every predetermined time interval, or may make a notification when there is a change in the state, for example, when an ignition is turned on or off or when the engine is stopped.

The line state detection unit 47 acquires a connection state of the first update device 10 to the Internet 5 and notifies the update start determination unit 40 and the update trigger notification unit 45 of the connection state. The line state detection unit 47 may notify the update start determination unit 40 and the update trigger notification unit 45 of the connection state every predetermined time interval, or may make a notification when there is a change in the connection state. However, instead of the connection state to the Internet 5, the line state detection unit 47 may also determine whether a specific URI can be accessed and notify the update start determination unit 40 and the update trigger notification unit 45 of the detection result. For example, it may be determined whether a URI that stores a resource necessary for providing a predetermined online service can be accessed.

(Functional Configuration of Second Update Device)

The second update device 11 includes an update management unit 80, an update unit 81, a communication unit 83, and an HMI 84 as functions thereof. The update management unit 80, the update unit 81, the communication unit 83, and the HMI 84 correspond to the update management unit 30, the update unit 31, the communication unit 33, and the HMI 34 of the first update device 10, respectively. The update management unit 80 includes a second control unit 91 and a second client tree DB 92. The second control unit 91 and the second client tree DB 92 correspond to the first control unit 71 and the first client tree DB 72 of the first update device 10, respectively. In FIG. 1, only the second control unit and the second client tree DB 92 are described as the configuration of the update management unit 80, but the update management unit 80 includes all the functions of the update management unit 30. Description of each function is omitted because it is similar to that of the first update device 10.

(Functional Configuration of Server)

The server 2 includes a server control unit 61, a server tree DB 62, and a data provision unit 63 as functions thereof.

The server control unit 61 exchanges a prescribed message with the first control unit 71 or the second control unit 91 to implement software update processing by the first control unit or the second control unit 91. Specific processing and procedures will be described below.

The server control unit 61 is a device management (DM) server defined in Open Mobile Alliance (OMA), and on the other hand, the first control unit 71 and the second control unit 91 are DM clients defined in the OMA. OMA DM is a type of technology used in the software update of mobile phones and is a mechanism for exchanging information necessary for the software update between a server and a client through access to a tree-structure database. The data provision unit 63 provides various types of information necessary for the software update to the first update device 10 and the second update device 11 based on an operation command from the server control unit 61, a request from the first update device 10, and a request from the second update device 11. The various types of information necessary for the software update include the update timing, notification information, and update data, which will be described below. These pieces of information are transmitted using a communication protocol such as HTTP or FTP.

(Hardware Configuration of First Update Device)

FIG. 2 is a diagram showing a hardware configuration of the first update device 10. The first update device 10 includes a storage unit 151, a CPU 152, a storage 159, a WAN I/F 154, a CAN I/F 155, a LAN I/F 157, a bus 156, and an HMI 158.

The CPU 152 controls information handled by the first update device 10 and operates in accordance with a description of software saved in the storage unit 151. The storage unit 151 is a memory that temporarily saves information handled by the CPU 152 and exchanges data via the bus 156. The storage 159 is a non-volatile storage device in which software and the like are saved, and may be a hard disk or an SSD equipped with a file system, or may be a storage element such as a flash ROM without a file system. The storage unit 151, the CPU 152, and the storage 159 correspond to the update management unit 30 and the update unit 31 in FIG. 1.

The WAN I/F 154 is an interface that wirelessly transmits/receives information to/from the server 2 via the Internet 5, and can use various wireless communication standards such as LTE, 3G, 4G, IEEE 802.16, IEEE 802.11, and infrared rays. The CAN I/F 155 is an interface of a controller area network (CAN) that is a dedicated network used in the vehicle 1, and acquires information related to the vehicle 1, for example, a state of an ignition from the ECU (not shown) mounted on the vehicle 1. The LAN I/F 157 is an interface connected to the LAN network 18. The WAN I/F 154, the CAN I/F 155, and the LAN I/F 157 correspond to the communication unit 33 in FIG. 1. The HMI 158 includes a device that presents information to the user, such as a liquid crystal display, and a device that receives an input from the user, such as a touch panel. The HMI 158 presents information to the user based on an operation command of the CPU 152 and transmits the input from the user to the CPU 152. The HMI 158 corresponds to the HMI 34 in FIG. 1.

The above is the hardware configuration of the first update device 10. As described above, since the second update device 11 has a hardware configuration the same as that of the first update device 10, the description thereof is omitted.

(Hardware Configuration of Server)

FIG. 3 is a diagram showing a hardware configuration of the server 2. The server 2 includes a storage unit 180, a CPU 181, a storage 183, a WAN I/F 184, and a bus 182.

The CPU 181 of the server 2 controls input/output of information handled by the server 2 and operates in accordance with a description of software saved in the storage unit 180. The storage unit 180 is a memory that temporarily saves information handled by the CPU 181 and exchanges data via the bus 182. The storage 183 is a non-volatile storage device that saves software of the first update device 10 and the second update device 11 and holds the information held in the storage unit 180 even when the power is turned off. The storage 183 may be a hard disk, an SSD, a holographic drive, and the like, which are equipped with a file system. The storage unit 180, the CPU 181, and the storage 183 correspond to the server control unit 61 and the server tree DB 62 in FIG. 1. The WAN I/F 184 is an interface that wirelessly transmits and receives information via the bus 182, and can use, for example, LTE, 3G, 4G, IEEE 802.16, IEEE 802.11, and infrared rays. The WAN I/F 184 corresponds to the data provision unit 63 in FIG. 1.

(First Client Tree DB)

FIG. 4 is a diagram showing a configuration of the first client tree DB 72 included in the first update device 10. The first client tree DB 72 is a database having a tree structure and includes a plurality of nodes. A node can contain information, but in addition to the information that the node contains, the presence or absence of the node and the name of the node may also be used for a control described below.

The vertex of the tree structure of the first client tree DB 72 is a root 101. Under the root 101, there are three nodes, that is, a DevInfo 102, a DevDetail 104, and a 1stSCM 105. Under the DevInfo 102, device feature information such as a 1stVIN 103, which is an identifier of the vehicle 1, is disposed. Although accessory information of the vehicle is stored under the DevDetail 104, the node under the DevDetail 104 is omitted in FIG. 4. Under the 1stSCM 105, there is a node used for the software update. Hereinafter, nodes under the 1stSCM 105 will be described in detail. Under the 1stSCM 105, there are a Download 106 that is a node related to the download and an Inventory 110 that is a node for updating the software.

Under the Download 106, there is an ABCv2s 107 indicating a package to be downloaded. This node name means, for example, a package name called "ABCv2s" which is a stable version (Stable) of version 2 of software called "ABC". When there is other software to be downloaded by the first update device 10, the software is placed in parallel with the ABCv2s 107 under the Download 106.

Under the ABCv2s 107, there are a PkgURL 108 in which a download destination URL of a package is stored, a Status 109 in which a state related to downloading is stored, and an Operation 110 that has an operation command as a subordinate node. When a Download 111 is disposed under the Operation 110 based on a command of the server 2, the update data acquisition unit 73 is operated to download the package "ABCv2s" from the URL indicated by the PkgURL 108. Nodes under the ABCv2s 107 are added from the server 2 via the Internet 5.

The Inventory 110 disposed in parallel with the Download 106 under the 1stSCM 105 has nodes of a Delivered 121 and a Deployed 130 thereunder.

Under the Delivered 121, information for executing the software update by using the downloaded package is stored. Under the Delivered 121, there is a node ABCv2s 122 including the name of the downloaded package. Under the ABCv2s 122, there are a Status 123 in which a state related to update is stored and an Operation 124 that has an operation command as a subordinate node. Under the Operation 124, there are an Install 125 that is disposed based on a command of the server 2 and is one of the conditions for executing the update and an Ext 126 that stores additional conditions for executing the update. Additional conditions for executing the update are stored in an update timing 191 provided under the Ext 126. That is, when there is a node called Install 125 and all the conditions stored in the update timing 191 are satisfied, installation of the downloaded package "ABCv2s", that is, update of the software "ABC" is started. The configuration of the update timing 191 will be described below.

Under the Deployed 130, current information on software is stored. Under the Deployed 130, there is a node having the name of the software, that is, an ABC 131. Under the ABC 131, there are an Available version 132 in which a latest available version number is stored, a Version 133 in which a current version number is stored, and an Ext 137 having notification information 195 thereunder. The notification information 195 will be described below.

(Second Client Tree DB)

FIG. 5 is a diagram showing a configuration of the second client tree DB 92 included in the second update device 11. The second client tree DB 92 is a database having a tree structure and includes a plurality of nodes. The configuration of the second client tree DB 92 is substantially the same as that of the first client tree DB 72. That is, in principle, each node of the second client tree DB 92 is obtained by changing the hundreds digit of the reference numeral 1XX of each node constituting the first client tree DB 72 from "1" to "2".

However, considering that the software included in the first update device 10 and the software included in the second update device 11 are different and the version numbers thereof are also different, a PQRv3s 207 is placed under a Download 206, for example. This node name means, for example, a package name called "PQRv3s" which is a stable version of version 3 of the software called "PQR". In addition, a PQRv3s 222 having the same name as the package name to be downloaded is placed under a Delivered 221 in which information for executing the software update by using the downloaded package the software is stored. Further, a PQR 231 which is a node having the name of the software is placed under a Deployed 230 in which the current information of the software is stored.

(Server Tree DB)

FIG. 6 is a diagram showing a configuration of the server tree DB 62 included in the server 2. The server tree DB 62 is a database having a tree structure and includes a plurality of nodes. The server tree DB 62 stores information related to a plurality of update devices mounted on a plurality of vehicles. The information related to the update devices is obtained by replicating a part of a database included in each update device via communication. That is, the server tree DB 62 includes a part of the nodes of the first client tree DB 72 and a part of the nodes of the second client tree DB 92.

The vertex of the tree structure of the server tree DB 62 is a root 1001. Under the root 1001, there are a 1stVIN 1010, a 2ndVIN 1020, and the like which are nodes indicating respective vehicles. Information on each vehicle is stored under respective nodes. Under the 1stVIN 1010, there are a DevInfo 1002, a DevDetail 1004, a 1stSCM 1105, and a 2ndSCM 1205, which are nodes that store information of the vehicle 1.

A node under the DevInfo 1002 corresponds to the node under the "DevInfo 102" in the first client tree DB 72 and the node under the "DevInfo 202" in the second client tree DB 92. The DevDetail 1004 corresponds to the DevDetail 104 in the first client tree DB 72 and the DevDetail 204 in the second client tree DB 92. Each node under the 1stSCM 1105 corresponds to each node under the 1stSCM 105 in the first client tree DB 72. That is, a reference numeral "11xx" in the server tree DB 62 corresponds to a reference numeral "1xx" in the first client tree DB 72. Each node under the 2ndSCM 1205 corresponds to each node under the 2ndSCM 205 in the second client tree DB 92. That is, a reference numeral "12xx" in the server tree DB 62 corresponds to a reference numeral "2xx" in the second client tree DB 92.

(Update Timing)

The update timing 191 included in the first client tree DB 72 and an update timing 291 included in the second client tree DB 92 will be described with reference to FIGS. 7 and 8. As described above, the additional condition for executing the update is stored in the update timing. Since configurations of the update timing 191 and the update timing 291 are similar, the description will be focused on the update timing 191 and differences between the update timing 291 and the update timing 191.

As shown in FIG. 7, under the update timing 191, there are three nodes, that is, a vehicle state 1911, a first update device 1914A, and a second update device 1914B. General update conditions are stored under the vehicle state 1911. An update condition related to the first update device 10 is stored under the first update device 1914A. An update condition related to the second update device 11 is stored under the second update device 1914B. However, when there is no child node, parent node may be omitted. For example, when there is no update condition related to the first update device 10, the first update device 1914A may not be provided.

Under the vehicle state 1911, there are IGN information 1912 and a user permission 1913. The IGN information 1912 takes a value of "on" or "off" and indicates that one of the update conditions is that the ignition is operated to "on" or "off". The user permission 1913 indicates that one of the update conditions is receiving permission for updating from the user.

Under the first update device 1914A, there are three nodes connected in series, that is, an ABC 1915A, a Download 1916A, and a Version 1917A. These nodes indicate that one of the update conditions is that the version indicated by the version 1917A of the software called "ABC" in the first update device 10 is "Download".

Under the second update device 1914B, there are three nodes connected in series, that is, a PQR 1915B, an Install 1916 B, and a Version 1917B. These nodes indicate that one of the update conditions is that the version indicated by the Version 1917B of the software called "PQR" in the second update device 11 is "Install".

In summary, as shown in FIG. 7, the additional conditions for executing the update according to the information stored under the update timing 191 are that the ignition of the vehicle 1 is in a predetermined state, the permission is obtained from the user, the predetermined version of the software "ABC" is downloaded in the first update device 10, and the predetermined version of the software "PQR" is installed in the second update device 11. Since the update timing 191 is provided under the ABCv2s 122 as shown in FIG. 4, the update timing 191 is an additional condition for installing the ABCv2s 122, in other words, an additional condition for updating the software "ABC" to the version "2".

As shown in FIG. 8, under the update timing 291, there are three nodes, that is, a vehicle state 2911, a first update device 2914A, and a second update device 2914B. Under the vehicle state 2911, there is a line state 2912. The line state 2912 indicates that it is a condition that the connection with the Internet 5 is broken. Since the configurations of the first update device 2914A and the second update device 2914B are similar to that of the first update device 1914A described in FIG. 7, description thereof is omitted.

In summary, as shown in FIG. 8, the additional conditions for executing the update according to the information stored under the update timing 291 are that the connection with the Internet 5 is broken, the predetermined version of the software "ABC" is downloaded in the first update device 10, and the predetermined version of the software "PQR" is downloaded in the second update device 11. Since the update timing 291 is provided under the PQRv3s 222 as shown in FIG. 5, the update timing 291 is an additional condition for installing the PQRv3s 222, in other words, an additional condition for updating the software "PQR" to the version "3".

(Notification Information)

The notification information 195 included in the first client tree DB 72 and notification information 295 included in the second client tree DB 92 will be described with reference to FIGS. 9 and 10. The notification information 195 includes information on a condition, a transmission destination, and transmission content for the update trigger notification unit 45 to transmit the update trigger.

As shown in FIG. 9, the notification information 195 includes two nodes, that is, a Download completion 1951A and an Install completion 1951B. Under the Download completion 1951A, information on an update trigger that is notified under a condition that the download of a package is completed is stored. Under the Download completion 1951A, there are a first update device 1952A and a second update device 1952B. However, in the present embodiment, the first update device 1952A and the second update device 1952B have no meaning in the node name itself.

Under the first update device 1952A, there are three nodes, that is, a destination 1953A, a package 1954A, and a Version 1955A. The destination 1953A stores information indicating the transmission destination of the update trigger, for example, an IP address or a loopback address (127.0.0.1) of the first update device 10. The package 1954A indicates that the update trigger includes the name of the package. The Version 1955A indicates that the update trigger includes updated version information. The second update device 1952B has a configuration similar to that of the first update device 1952A.

Under the Install completion 1951B, information on an update trigger that is notified under a condition that the installation is completed is stored. However, in the example shown in FIG. 9, since there is no update trigger for which the installation completion is a condition, there is no node under the Install completion 1951B.

In summary, as shown in FIG. 9, when the download of the package "ABCv2s" is completed, update triggers including information on the name and version of the package are separately transmitted to the destination 1953A and the destination 1953B.

As shown in FIG. 10, the notification information 295 includes information on a condition, a transmission destination, and transmission content for an update trigger notification unit of the second update device 11 to transmit the update trigger. When the notification information 295 is compared with the notification information 195, differences lie in the presence/absence of the node and the value stored in the node, but the configurations are similar, so that the description of the configuration is omitted.

In summary, as shown in FIG. 10, the following two points are shown. First, when the download of the package "PQRv3s" is completed, update triggers including information on the name and version of the downloaded package are separately transmitted to the destination 2953A and the destination 2953B. Second, when installation of the package "PQRv3s" is completed, an update trigger including information on the name and version of the installed package is transmitted to a destination 2953C.

(Processing Sequence)

The exchange of messages related to the software update in the server 2, the first update device 10, and the second update device 11 will be described with reference to sequence diagrams of FIGS. 11 and 12. In either sequence diagram, time elapses from the upper side to the lower side, and the time is continuous from the lower part of FIG. 11 to the upper part of FIG. 12. In FIG. 11, the exchange of messages between the server 2 and the first update device 10 will be described in detail. In FIG. 12, the exchange of messages between the server 2 and the second update device 11 will be described in a simplified manner.

At the time when the sequence to be described below is started, the version of the software "ABC" included in the first update device 10 is "1", and the version of the software "PQR" included in the second update device 11 is "2". At the time when the sequence is started, the first client tree DB 72 does not have a node under the Download 106 or a node under the Delivered 121. At the time when the sequence is started, the second client tree DB 92 does not have a node under the Download 206 or a node under the Delivered 221.

First, the first control unit 71 of the first update device 10 transmits VIN information for identifying the vehicle to the server control unit 61 (S301). Accordingly, the server 2 identifies that a communication target vehicle is the vehicle 1 and acquires information on the latest version of software included in the vehicle 1 from a database (not shown). The information on the latest version is that, for example, the latest version of the software "ABC" is "2" and the latest version of the software "PQR" is "3". Next, the server control unit 61 transmits the acquired information on the latest version and a version information acquisition request to the first control unit 71 (S302).

The first control unit 71 stores the received information on the latest version in the first client tree DB 72 (S350). More specifically, the value "2" is stored in the node of the AvailableVersion 132 under the ABC 131 under the Deployed 130 in the first client tree DB 72. Although the information on the latest version received from the server 2 includes the information on the software "PQR", the information on the software "PQR" is not stored in the first client tree DB 72. Therefore, the information on the software "PQR" is discarded. Subsequently, the first control unit 71 acquires information of all the nodes under the Deployed 130 from the first client tree DB 72 (S351), and transmits the information to the server control unit 61 (S303).

The server control unit 61 saves the received information on the nodes under the Deployed 130 in the server tree DB 62 as information of nodes under a Deployed 1130 of the 1stSCM 1105. Then, it is determined whether the software is to be updated based on the saved information of the nodes under the Deployed 1130. That is, the server control unit 61 compares an AvailableVersion 1132 and the Version 1133, and determines that the update is necessary when the AvailableVersion 1132 is newer (S352).

Next, the server control unit 61 acquires the notification information 195 and software update information from the storage 183 included in the server 2 (S361). Specifically, the software update information is the nodes under the Download 106 in FIG. 4 excluding the Download 111. Then, the server control unit 61 transmits the software update information and the notification information 195 to the first control unit 71 (S304).

The first control unit 71 stores the received information in the first client tree DB 72. Specifically, the notification information 195 is added under the Ext 137 (S362), and the software update information is added under the 1stSCM 105 as the Download 106 (S353). Then, a response indicating that the update information is set is returned to the server control unit 61 (S305).

The server control unit 61 transmits a download execution instruction to the first control unit 71 in order to cause the first update device 10 to download the package ABCv2s 107 (S308). This instruction causes the Download 111 to be created under the Operation 110 of the first client tree DB 72. When the Download 111 is created under the Operation 110 of the first client tree DB 72, the first control unit 71 instructs the update data acquisition unit 73 to execute the download (S356). The update data acquisition unit 73 acquires the update data from the URL described in the PkgURL 108. Here, when the URL described in the PkgURL 108 is inside the server 2, the update data acquisition unit 73 requests the data provision unit 63 for the package ABCv2s (S309) and acquires the package (S310). When the acquisition of the package is completed, the update data acquisition unit 73 notifies the first control unit 71 that the download ends (S357). Here, the first control unit 71 executes update trigger notification transmission processing described below (S368). The first control unit 71 notifies the server control unit 61 that the download is completed (S311).

Next, the server control unit 61 transmits a software update permission request message for confirming to the user whether software update can be executed to the first control unit 71 (S306). The first control unit 71 causes the HMI 34 to display a message requiring permission to update the software (S354). The HMI 34 displays the requested message, receives a response from the user, and returns the response to the first control unit 71 (S355). The first control unit 71 transmits information indicating whether permission is permitted to the server control unit 61 (S307). When the user permits here, the following description will be continued with reference to FIG. 12.

Next, the server control unit 61 acquires the update timing 1191 from the storage 183 (S360) and transmits an update timing notification to the first control unit 71 together with the message instructing the execution of the software update (S314). However, the update timing 1191 may be read from the server tree DB 62.

The first control unit 71 saves the received update timing as the update timing 191 in the first client tree DB 72 (S363) and creates the node Install 125 under the Operation 124 based on a message instructing the execution of the software update. Then, the first control unit 71 interprets the update timing 191 and waits for the update trigger (S365), and determines whether all the update triggers are prepared every predetermined time interval (S366). Here, since not all the update triggers are prepared, the update trigger wait (S365) is continued. Specifically, the update trigger indicating the installation completion of the version "3" of the software "PQR" in the second update device 11 is waited for in the update timing 191 shown in FIG. 7.

The processing from the VIN transmission (S301A) to the saving of the update timing 291 in the second client tree DB 92 (S363A) by the second update device 11 is similar to the processing of S301 to S363 by the first update device 10. As shown in FIG. 8, in the update timing 291, the line state 2912 is offline, the download of the software "ABC" in the first update device 10 is completed, and the download of the software "PQR" in the second update device 11 is completed. Therefore, all the conditions are satisfied at the time when S363A is executed. Therefore, the second control unit 91 transmits an update start command to the update unit 81 (S317) and causes the update unit 81 to execute the software update processing (S390). When the update processing ends, the update unit 81 notifies the second control unit 91 of the end (S318). When receiving the notification indicating that the update processing ends, the second control unit 91 transmits an update trigger based on the notification information 295 (S368, S369). As shown in FIG. 10, the notification information 295 indicates that the destination 472 is notified of the name and version number of the package that is updated. Therefore, since the destination 472 indicates the first update device 10, the second control unit 91 transmits an update trigger to the first update device 10. The update trigger includes the name "PQRv3s" and the version number "3" of a package that is updated and indicates that the installation is completed.

Upon receiving the update trigger, the first control unit 71 determines that all the update triggers are prepared (S366) and causes the update unit 31 to start update (S317). The update unit 31 executes the software update processing 390 and outputs a notification indicating the end of the update processing to the first control unit 71 when the update processing ends (S318).

According to the operations described above, in a system including a plurality of software update devices, the software can be updated while maintaining the dependency between the software.

(Screen Display)

FIG. 13 is a diagram showing an example of a message in which the HMI 34 inquires the user whether to update in S354 of FIG. 11. The display shown in FIG. 13 is displayed on the HMI 34 included in the first update device 10. In the example shown in FIG. 13, the first update device 10 has a car navigation function, and a message inquiring whether to update is displayed on an interface screen used for the car navigation.

FIG. 14 is a diagram showing an example of the message inquiring the user whether to update displayed on a device other than the first update device 10, when the HMI 34 operates as an HMI control unit. In the example shown in FIG. 14, the message is displayed on a mobile terminal held by the user.

(Flowchart)

The operations when the first update device 10 receives the notification information 195, the update timing 191, the update execution instruction, and the download execution instruction from the server 2 will be described with reference to FIGS. 15 to 18. The execution subject of each step of the flowchart described below is the CPU 152 of the first update device 10. The second update device 11 also executes the processing similar to that of the first update device 10.

FIG. 15 is a flowchart showing processing when the first update device 10 receives the notification information 195 from the server 2. In step S2103, the CPU 152 searches for a node of the first client tree DB 72 that stores the received notification information 195. In the subsequent step S2104, the CPU 152 saves the received notification information 195 in the node specified in step S2103. Then, the processing shown in FIG. 15 ends.

FIG. 16 is a flowchart showing processing when the first update device 10 receives the update timing 191 from the server 2. In step S2107, the CPU 152 searches for a node of the first client tree DB 72 that stores the received update timing 191. In the subsequent step S2108, the CPU 152 saves the received update timing 191 in the node specified in step S2107. Then, the processing shown in FIG. 16 ends.

FIG. 17 is a flowchart showing processing when the first update device 10 receives the update execution instruction from the server 2. By receiving the update execution instruction from the server 2, one of the conditions for creating the Install 125 node and executing the update is satisfied as described above, but the description of the creation of the Install 125 node is omitted here.

In step S2110, the CPU 152 acquires the update timing 191 from the first client tree DB 72. In the subsequent step S2111, the CPU 152 waits for an update trigger and waits for the vehicle condition to be satisfied. In the subsequent step S2120, the CPU 152 saves the received update trigger in the storage 159 or the storage unit 151. In the subsequent step S2112, the CPU 152 determines whether all the update triggers described in the update timing 191 are prepared, in other words, whether all the additional conditions for executing the update are satisfied. When the CPU 152 determines that all the update triggers are prepared, the process proceeds to step S2113, and when the CPU 152 determines that there is a condition that is not satisfied, the process returns to step S2111.

In step S2113, the CPU 152 executes the software update processing. In the subsequent step S2114, the CPU 152 determines whether the update is completed. The process remains in step S2114 until it is determined that the update is completed. When it is determined that the update is completed, the process proceeds to step S2115.

In step S2115, the CPU 152 reads the notification information 195 from the first client tree DB 72. In the subsequent step S2117, information to be notified when the update is completed is extracted from the notification information 195, and a notification indicating that the update is completed, that is, an update trigger is transmitted. However, when the notification information 195 is in the example shown in FIG. 9, there is no node under the Install completion 1951B, so that the processing shown in FIG. 17 ends without executing this step. In the subsequent step S2118, it is determined whether the update triggers are transmitted to all the target destinations. When it is determined that the update triggers are transmitted to all the targets, the processing shown in FIG. 17 ends, and when it is determined that there is a target to which the update trigger is not transmitted, the process returns to step S2117.

FIG. 18 is a flowchart showing processing when the first update device 10 receives the download execution instruction from the server 2.

In step S2201, the CPU 152 causes the update data acquisition unit 73 to acquire the update data. The download is executed between the update data acquisition unit 73 and the data provision unit 63, and any protocol may be used as long as the protocol can transfer data, such as HTTP or FTP. The acquisition destination of the update data is stored in the first client tree DB 72 as, for example, the PkgURL 108. In the subsequent step S2202, the CPU 152 determines whether the download of the update data is completed. For example, this determination can be made based on whether a download completion notification is received from the update data acquisition unit 73. When it is determined that the download is completed, the process proceeds to step S2203, and when it is determined that the download is not completed, the process remains in step S2202.

In step S2203, the CPU 152 reads the notification information 195 from the first client tree DB 72. In the subsequent step S2204, information to be notified when the download is completed is extracted from the notification information 195, and a notification indicating that the download is completed, that is, an update trigger is transmitted. When the notification information 195 is in the example shown in FIG. 9, update triggers are transmitted to two devices, and the update triggers include the name and version of the package whose download is completed. In subsequent step S2205, it is determined whether the update triggers are transmitted to all the target destinations. If it is determined that the update triggers are transmitted to all the targets, the processing shown in FIG. 18 ends, if it is determined that there is a target to which the update trigger is not transmitted, the process returns to step S2204.

Even when the break of the connection of the first update device 10 with the Internet 5 occurs at step S2110 or later steps, since the update timing 191 and the notification information 195 can be acquired from the first client tree DB 72, there is no problem in the software update. Also in this case, since the update will not be executed unless the conditions defined by the update timing 191 are satisfied, the software can be updated while maintaining the dependency between the software by appropriately setting the update timing 191 even when the connection with the server 2 is broken.

According to the first embodiment described above, the following functional effects can be obtained.

(1) The first update device 10, which is a software update device, is connected to one or more software update devices, that is, the second update device 11, and the server 2 via the Internet 5. The first update device 10 includes: the update data acquisition unit 73 that receives the update data from the server 2; the update unit 31 that executes the software update using the update data; the communication unit 33 that communicates with another software update device; the update timing reception unit 41 that receives from the server 2 the update timing 191 in which the conditions for updating the software including the reception of the update trigger are described; the notification information reception unit 42 that receives from the server 2 the notification information 195 including the conditions for notifying another software update device; the update trigger notification unit 45 that transmits the update trigger to another software update device based on the notification information 195; the update trigger reception unit 44 that receives the update trigger from another software update device; and the update start determination unit 40 that causes the update unit 31 to execute the software update when it is determined that all the conditions described in the update timing 191 are satisfied.

Since the update start determination unit 40 executes the software update when all the conditions described in the update timing 191 received from the server 2 are satisfied, the software can be updated while satisfying the software dependencies. For example, when there is a dependency between the software "ABC" installed in the first update device 10 and the software "PQR" installed in the second update device 11, the software can be updated while satisfying the software dependency by using the appropriately set update timing 191. That is, as shown in FIG. 7, the software "ABC" of the first update device 10 can be updated under the condition that the software "PQR" in a predetermined version is installed in the second update device 11.

In addition, since the first update device 10 includes the update trigger notification unit 45, the update trigger can be transmitted to another software update device based on the notification information 195. That is, the software can be updated based on the reception of the update trigger in another software update device. Further, after receiving the update timing 191, the notification information 195, and the update data from the server 2, the first update device 10 can update the software by using the received information even when the connection with the server 2 is broken.

(2) The notification information 195 indicates that the update trigger is transmitted when the software is updated. The update trigger notification unit 45 transmits the update trigger when the update unit 31 completes the software update.

Therefore, the first update device 10 can notify another software update device of the software update in the first update device 10. That is, the software can be updated in another software update device while satisfying the software dependencies.

(3) The notification information 195 indicates that the update trigger is transmitted when the update data acquisition unit 73 receives the update data. The update trigger notification unit 45 transmits the update trigger when the update data acquisition unit 73 receives the update data.

Therefore, the first update device 10 can start update under a condition that another device receives the update data, in other words, at least a part of preliminary preparation for another device to execute the update is completed.

(4) The first update device 10 is mounted on the vehicle 1. The update timing 191 includes a state of on or off of the ignition of the vehicle 1. The update start determination unit 40 can detect the on or off of the ignition.

By setting the off state of the ignition as the condition for starting the update, the software related to the traveling of the vehicle 1 can be safely updated. In addition, since the user generally does not use the vehicle 1 for a while after the user turns off the ignition, the user will not be disturbed even when an update requiring a long process is executed. By setting the on state of the ignition as the condition for starting the update, the update can be executed when the user easily understand that the timing can be selected.

(5) The first update device 10 is mounted on the vehicle 1 connected to the Internet 5. The update timing 191 includes disconnection with the Internet 5. The update start determination unit 40 can detect the disconnection.

By setting the disconnection with the Internet 5 as the condition for starting the update, the degradation in availability due to the software update can be suppressed. The details are as follows. That is, the software that requires connection to the Internet 5 in the operation cannot operate while the connection with the Internet 5 is broken. When the software update is started, the software cannot be used until the update ends. Therefore, by overlapping the time when the software cannot be used due to the disconnection with the time when the software cannot be used due to the update, the degradation in availability due to the software update can be suppressed.

(6) The first update device 10 includes the storage unit 151 and the storage 159. The update trigger reception unit 44 stores the received update trigger in the storage unit 151 or the storage 159. The update start determination unit 40 determines whether to start the update, based on the update trigger stored in the storage unit 151 or the storage 159.

Therefore, even when the update conditions are satisfied at different timings, the update can be started.

(Modification 1)

The update timing 191 may not include the node of the vehicle state 1911 and the nodes under the vehicle state 1911. Different nodes may be arranged under the vehicle state 1911. For example, nodes representing a condition related to the time or a condition related to the state of the engine of the vehicle 1 may be arranged.

(Modification 2)

Although the conditions for the first update device 10 and the second update device 11 are stored in the update timing 191, only the conditions for either one of the devices are stored. Further, conditions related to two or more pieces of software may be stored for one update device. For each piece of software, a condition other than "Download" and "Install", for example, a "Remove" indicating that the software is deleted may be set up.

(Modification 3)

A node other than the Download completion 1951A or the Install completion 1951B may be provided under the notification information 195. For example, a node such as "IGN ON" indicating that the ignition is turned on or "update permission" indicating that update permission is obtained from the user may be provided under the notification information 195. That is, the update trigger notification unit 45 may transmit the update trigger when the ignition is turned on or when the update permission is obtained from the user. This configuration is effective when another update management device cannot directly obtain the ignition information or the user permission information.

(Modification 4)

In the first embodiment, the first client tree DB 72, the second client tree DB 92, and the server tree DB 62 are expressed as tree-structure databases, that is, hierarchical databases, but the format of these databases is not limited thereto. Other formats such as a network database and a relational database may be used.

(Modification 5)

The first update device 10 transmits and receives the update trigger, but may also only transmit the update trigger without receiving the update trigger, or only receive the update trigger without transmitting the update trigger. For example, when the first update device 10 only transmits the update trigger without receiving the update trigger, the first update device 10 may not include the update trigger reception unit 44. When the first update device 10 only receives the update trigger without transmitting the update trigger, the notification information reception unit 42 and the update trigger notification unit 45 may not be included.

According to the modifications, the following software update devices are also included in the invention.

(1) A software update device is connected to one or more software update devices and a server via a network. The software update device includes: a reception unit that receives update data from the server; an update unit that updates software using the update data; a communication unit that communicates with another software update device; an update timing reception unit that receives from the server an update timing in which conditions for updating the software including a reception of an update trigger are described; an update trigger reception unit that receives the update trigger from another software update device; and an update start determination unit that causes the update unit to update the software when it is determined that all the conditions described in the update timing are satisfied.

(2) A software update device is connected to one or more software update devices and a server via a network. The software update device includes: a reception unit that receives update data from the server; an update unit that updates software using the update data; a communication unit that communicates with another software update device; an update timing reception unit that receives from the server an update timing in which conditions for updating the software are described; a notification information reception unit that receives from the server notification information including conditions for notifying another software update device; an update trigger notification unit that transmits an update trigger whose reception is a condition for updating the software to another software update device based on the notification information; and an update start determination unit that causes the update unit to update the software when it is determined that all the conditions described in the update timing are satisfied.

(Modification 6)

In the notification information 195 stored in the first update device 10, the first update device 10 may not be described as a destination, and the update trigger may not be transmitted from the first update device 10 to the first update device 10. In this case, the information indicating that the download is completed is transmitted to the update start determination unit 40 without passing through the update trigger notification unit 45 or the update trigger reception unit 44.

Second Embodiment

A second embodiment of the software update system S will be described with reference to FIGS. 19 to 21. In the following description, the same components as those of the first embodiment are denoted by the same reference numerals, and differences will be mainly described. The points not specifically described are the same as those of the first embodiment. The present embodiment is different from the first embodiment mainly in that the first update device and second update device update software of another device.

(System Configuration)

FIG. 19 is a diagram showing a configuration of the software update system S according to the second embodiment. The vehicle 1 includes the first update device 10, the second update device 11, a LAN network 18, a first ECU 511, a second ECU 512, a third ECU 513, a first CAN network 501, and a second CAN network 502. The first update device 10 and the second update device 11 are connected via the LAN network 18. The first update device 10, the first ECU 511, and the second ECU 512 are connected via the first CAN network 501. The second update device 11 and the third ECU 513 are connected via the second CAN network 502.

The first ECU 511 is provided with software "DEF", the second ECU 512 is provided with software "GHI", and the third ECU 513 is provided with software "STU". The first update device 10 updates the software of the first ECU 511 and the software of the second ECU 512. The second update device 11 updates the software of the third ECU 513.

(Hardware Configuration of ECU)

Since hardware configurations of the first ECU 511, the second ECU 512, and the third ECU 513 are similar, the hardware configuration of the first ECU 511 will be described as a representative.

FIG. 20 is a diagram showing the hardware configuration of the first ECU 511. The first ECU 511 includes a storage unit 170, a CPU 171, a storage 173, a CAN I/F 174, and a bus 172.

The CPU 171 of the first ECU 511 controls input/output of information handled by the first ECU 511 and operates in accordance with a description of software saved in the storage 173. The storage unit 170 temporarily saves information handled by the CPU 171 and exchanges data with the CPU 171 via the bus 172. The storage 173 is a non-volatile storage device in which the software of the first ECU 511 is stored. The first ECU 511 operates by software saved in the storage 173, and the operation of the first ECU 511 can be changed by updating the software. The CAN I/F 174 is a CAN interface that is a dedicated network used in the vehicle 1 and communicates with the first update device 10 via the first CAN network 501. It is possible to receive the software via this interface and rewrite the software stored in the storage 173.

(First Client Tree DB)

The first client tree DB 72 according to the second embodiment is obtained by replacing "ABC" in the configuration of the first client tree DB 72 according to the first embodiment with "DEF" and "GHI".

FIG. 21 is a diagram schematically showing the first client tree DB 72 according to the second embodiment. Under the Download 106, placed are a node of "DEFv2s" and a node of "GHIv4s" in which information of two packages to be downloaded are stored. Similarly, information of two pieces of software is stored under the nodes of Delivered 121 and Deployed 130. That is, update timings corresponding to respective piece of software are arranged under the Delivered 121, and notification information corresponding to respective piece of software is arranged under the Deployed 130.

Since the configuration of the second client tree DB 92 is obtained by changing the names of the software and the package from the configuration of the first embodiment, a description thereof is omitted.

According to the second embodiment described above, the following functional effects can be obtained.

(1) The first update device 10 is connected to the first ECU 511 and the second ECU 512. The update unit 31 updates the software of the first ECU 511 and the software of the second ECU 512. Therefore, even when the first ECU 511 and the second ECU 512 cannot execute a control related to the software update, instead of the first ECU 511 and the second ECU 512, the first update device 10 can update the software in the first ECU 511 and the software in the second ECU 512 while satisfying the software dependencies.

(Modification of Second Embodiment)

The first update device 10 may update not only the software of the first ECU 511 and the software of the second ECU 512 but also the software of the first update device 10. The second update device 11 may update not only the software of the third ECU 513 but also the software of the second update device 11.

Although the program of the first update device 10 is stored in the storage 159, the first update device 10 includes an input/output interface (not shown) and may read the program from another device via a medium that can be used by the input/output interface and the first update device 10 if necessary. Here, the medium refers to, for example, a storage medium that can be attached to or detached from the input/output interface, or a communication medium, that is, a wired, network wireless, optical network and the like, or a carrier wave or a digital signal propagating through the network. Further, part or all of the functions realized by the program may be implemented by a hardware circuit or an FPGA.

Any of the above-described embodiments and modifications may be combined with each other.

Although various embodiments and modifications have been described above, the invention is not limited to the above contents. Other aspects or forms that can be conceived within the technical concept of the invention are also included in the scope of the invention.

The disclosure of the following priority basic application is incorporated herein by reference.

Japanese Patent Application No. 2016-252787 (filed on Dec. 27, 2016)

Reference Sign List 1 vehicle
2 server
S software update system
10 first update device
11 second update device
31 update unit
33 communication unit
40 update start determination unit
41 update timing reception unit
42 notification information reception unit
44 update trigger reception unit
45 update trigger notification unit
191 update timing
195 notification information
451 notification information

The invention claimed is:

1. A software update device connected to one or more other software update devices and a server via a network, the software update device comprising:
   a communication interface to communicate with the one or more other software update devices;
   a central processing unit (CPU);
   a memory in communication with the CPU, the memory storing a plurality of instructions executable by the CPU to cause the software update device to implement:
      a reception unit that receives update data from the server;
      an update unit that updates software using the update data;
      an update timing reception unit that receives and stores an update timing from the server defining a plurality of update triggers that must be received from the one or more other software update devices to execute updating the software of the software update device;
      a notification information reception unit that receives, from the server, notification information defining each of the plurality of update triggers in terms of at least one of:
         a destination to which the respective update trigger will be transmitted, a software package name, or a software version;
      an update trigger notification unit that transmits an update trigger of the plurality of update triggers from the software update device to one or more of the other software update devices or the server, based on the notification information received from the server;
      an update trigger reception unit that receives an update trigger of the plurality of update triggers specified in the update timing received from the server from one or more of the other software update devices; and
      an update start determination unit that causes the update unit to execute updating of the software of the software update device when it is determined that all of the update triggers of the plurality of update triggers described in the update timing have been received, wherein
      the notification information received from the server further defines that the update trigger is transmitted from the software update device to the one or more of the other software update devices when software installation of the update is completed, and
      the update trigger notification unit transmits the update trigger from the software update device when the update unit completes installing the update of the software.

2. The software update device according to claim 1, wherein
   the notification information received from the server further defines that the update trigger is transmitted from the software update device when the reception unit completes downloading of the update data prior to installing the update, and the update trigger notification unit transmits the update trigger when the reception unit completes downloading of the update data prior to installing the update.

3. The software update device according to claim 1, wherein the software update device is mounted on a vehicle, the update timing includes a state of on or off of an ignition of the vehicle, and the update start determination unit can detect the on or off of the ignition.

4. The software update device according to claim 1, wherein the software update device is mounted on a vehicle connected to Internet, the update timing includes disconnection with the Internet, and the update start determination unit can detect the disconnection.

5. The software update device according to claim 1, further comprising:

a storage unit, wherein the update trigger reception unit stores the received update trigger in the storage unit, and the update start determination unit determines whether to start the update based on the update trigger stored in the storage unit.

6. The software update device according to claim 1, wherein the software update device is connected to a control unit, and the update unit updates at least one piece of software of the software update device and software of the control unit.

7. A software update device connected to one or more other software update devices and a server via a network, the software update device comprising:

a communication interface to communicate with the one or more other software update devices;

a central processing unit (CPU);

a memory in communication with the CPU, the memory storing a plurality of instructions executable by the CPU to cause the software update device to implement:

a reception unit that receives update data from the server;

an update unit that updates software using the update data;

an update timing reception unit that receives and stores an update timing from the server defining a plurality of update triggers that must be received from the one or more other software update devices to execute updating the software of the software update device;

an update trigger reception unit that receives an update trigger of the plurality of update triggers specified in the update timing received from the server from one or more of the other software update devices; and an update start determination unit that causes the update unit to execute updating of the software of the software update device when it is determined that all of the update triggers of the plurality of update triggers described in the update timing have been received, wherein notification information received from the server further defines that the update trigger is transmitted from the software update device when the reception unit completes downloading of the update data prior to installing the update, and an update trigger notification unit transmits the update trigger from the software update device when the reception unit completes downloading of the update data prior to installing the update.

8. The software update device according to claim 7, wherein notification information received from the server further defines that the update trigger is transmitted from the software update device when the reception unit completes downloading of the update data prior to installing the update, and an update trigger notification unit transmits the update trigger from the software update device when the reception unit completes downloading of the update data prior to installing the update.

9. The software update device according to claim 7, wherein the software update device is mounted on a vehicle, the update timing includes a state of on or off of an ignition of the vehicle, and the update start determination unit can detect the on or off of the ignition.

10. The software update device according to claim 7, wherein the software update device is mounted on a vehicle connected to Internet, the update timing includes disconnection with the Internet, and the update start determination unit can detect the disconnection.

11. The software update device according to claim 7, further comprising:

a storage unit, wherein the update trigger reception unit stores the received update trigger in the storage unit, and the update start determination unit determines whether to start the update based on the update trigger stored in the storage unit.

12. The software update device according to claim 7, wherein the software update device is connected to a control unit, and the update unit updates at least one piece of software of the software update device and software of the control unit.

13. A software update device connected to one or more other software update devices and a server via a network, the software update device comprising:

a communication interface to communicate with the one or more other software update devices;

a central processing unit (CPU);

a memory in communication with the CPU, the memory storing a plurality of instructions executable by the CPU to cause the software update device to implement:

a reception unit that receives update data from the server;

an update unit that updates software using the update data;

an update timing reception unit that receives and stores an update timing from the server defining a plurality of update triggers that must be received from the one or more other software update devices to execute updating the software of the software update device;

a notification information reception unit that receives, from the server; notification information defining each of the plurality of update triggers in terms of at least one of:

a destination to which the respective update trigger will be transmitted, a software package name, or a software version;

an update trigger notification unit that transmits an update trigger of the plurality of update triggers from the software update device to one or more of the other software update devices or the server, based on the notification information received from the server; and an update start determination unit that causes the update unit to execute updating of the software of the software update device when it is determined that all of the update triggers of the plurality of update triggers described in the update timing have been received, wherein the notification information received from the server further defines that the update trigger is transmitted from the software update device to the one or more of the other software update devices when software installation of the update is completed, and the update trigger notification unit transmits the update trigger from the software update device when the update unit completes installing the update of the software.

14. The software update device according to claim 13, wherein the notification information received from the server further defines that the update trigger is transmitted from the software update device when the reception unit completes downloading of the update data prior to installing the update, and the update trigger notification unit transmits the update trigger from the software update device when the reception unit completes downloading of the update data prior to installing the update.

15. The software update device according to claim 13, wherein the software update device is mounted on a vehicle, the update timing includes a state of on or off of an ignition of the vehicle, and the update start determination unit can detect the on or off of the ignition.

16. The software update device according to claim 13, wherein the software update device is mounted on a vehicle connected to Internet, the update timing includes disconnection with the Internet, and the update start determination unit can detect the disconnection.

17. A software update system comprising a plurality of software update devices and a server, wherein the server includes a distribution unit that distributes update data for updating software, and each of the plurality of software update devices comprises:

a communication interface to communicate with the server and one or more other software update devices;

a central processing unit (CPU);

a memory in communication with the CPU, the memory storing a plurality of instructions executable by the CPU to cause the software update device to implement:

a reception unit that receives the update data from the server;

an update unit that updates the software using the update data;

an update timing reception unit that receives and stores an update timing from the server defining a plurality of update triggers that must be received from the one or more other software update devices to execute updating software of each of plurality of software update devices;

a notification information reception unit that receives, from the server, notification information defining each of the plurality of update triggers in terms of at least one of:

a destination to which the respective update trigger will be transmitted, a software package name, or a software version;

an update trigger notification unit that transmits an update trigger of the plurality of update triggers from each of the plurality of software update devices to one or more of the other software update devices or the server, based on the notification information received from the server;

an update trigger reception unit that receives an update trigger of the plurality of update triggers specified in the update timing received from the server from one or more of the other software update devices; and an update start determination unit that causes the update unit to execute updating of the software of each of the plurality of software update devices when it is determined that all of the update triggers of the plurality of update triggers described in the update timing have been received, wherein the notification information received from the server further defines that the update trigger is transmitted from the software update device to the one or more of the other software update devices when software installation of the update is completed, and the update trigger notification unit transmits the update trigger from the software update device when the update unit completes installing the update of the software.

* * * * *